(12) United States Patent
Foskett et al.

(10) Patent No.: US 7,117,238 B1
(45) Date of Patent: Oct. 3, 2006

(54) METHOD AND SYSTEM FOR PERFORMING PIPELINED RECIPROCAL AND RECIPROCAL SQUARE ROOT OPERATIONS

(75) Inventors: Nicholas J. Foskett, Adelaide (AU); Robert J. Prevett, Jr., Danville, CA (US); Sean Treichler, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 591 days.

(21) Appl. No.: 10/247,115

(22) Filed: Sep. 19, 2002

(51) Int. Cl.
*G06F 7/38* (2006.01)
*G06F 7/52* (2006.01)

(52) U.S. Cl. .................. 708/502; 708/605; 708/654

(58) Field of Classification Search ............... 708/502
See application file for complete search history.

(56) References Cited

U.S. PATENT DOCUMENTS 5,179,659 A * 1/1993 Lien et al. .................. 345/561
5,274,580 A * 12/1993 Keryvel et al. ............. 708/653
6,363,405 B1 * 3/2002 Loginov ..................... 708/270
6,581,085 B1 * 6/2003 Yue et al. ................... 708/502

OTHER PUBLICATIONS

Ercegovac, et al., Reciprocation, Square Root, Inverse Square Root, and Some Elementary Functions Using Small Multipliers, *IEEE Transactions on Computers*, vol. 49, No. 7, Jul. 2000, pp. 628-637.

* cited by examiner

*Primary Examiner*—Tan V. Mai
(74) *Attorney, Agent, or Firm*—Patterson & Sheridan, L.L.P.

(57) ABSTRACT

A pipelined circuit configured to generate a Taylor's series approximation at least one function, preferably at least one of the reciprocal and the reciprocal square root, of an input value. The circuit is preloaded with or configured to generate a predetermined set of Taylor's series coefficients for each segment of the input value range. Other aspects of the invention are methods for determining preferred parameters for elements of such a circuit, a circuit designed in accordance with such a method, and a system (e.g., a pipelined graphics processor) for and method of pipelined graphics data processing using any embodiment of the circuit. The preferred parameters are determined by minimizing the circuit's size subject to constraints on input and output value format and output accuracy, assuming a specific function to be approximated and a specific degree for the approximation but allowing variation of parameters such as coefficient width and number of input value range segments.

35 Claims, 4 Drawing Sheets

METHOD AND SYSTEM FOR PERFORMING PIPELINED RECIPROCAL AND RECIPROCAL SQUARE ROOT OPERATIONS

TECHNICAL FIELD OF THE INVENTION

The invention relates to pipelined arithmetic circuits, to graphics processors (e.g., pipelined vertex processors or other pipelined graphics processors implemented as integrated circuits or portions of integrated circuits), and to methods for pipelined graphics data processing.

BACKGROUND OF THE INVENTION

In three dimensional graphics, surfaces are typically rendered by assembling a plurality of polygons in a desired shape. The polygons (which are typically triangles) are defined by vertices, and each vertex is defined by three dimensional coordinates in world space, by color values, and by texture coordinates and other attributes.

The surface determined by an assembly of polygons is typically intended to be viewed in perspective. To display the surface on a computer monitor, the three dimensional world space coordinates of the vertices are transformed into screen coordinates in which horizontal and vertical values (x, y) define screen position and a depth value z determines how near a vertex is to the screen and thus whether that vertex is viewed with respect to other points at the same screen coordinates. The color values define the brightness of each of red/green/blue (r, g, b) color at each vertex and thus the color (often called diffuse color) at each vertex. Texture coordinates (u, v) define texture map coordinates for each vertex on a particular texture map defined by values stored in memory.

The world space coordinates for the vertices of each polygon are processed to determine the two-dimensional coordinates at which those vertices are to appear on the two-dimensional screen space of an output display. If a triangle's vertices are known in screen space, the positions of all pixels of the triangle vary linearly along scan lines within the triangle in screen space and can thus be determined.

Typically, a rasterizer uses (or a vertex processor and a rasterizer use) the three-dimensional world coordinates of the vertices of each polygon to determine the position of each pixel of each surface ("primitive" surface") bounded by one of the polygons.

The color values of each pixel of a primitive surface (sometimes referred to herein as a "primitive") vary linearly along lines through the primitive in world space. A rasterizer performs (or a rasterizer and a vertex processor perform) processes based on linear interpolation of pixel values in screen space, linear interpolation of depth and color values in world space, and perspective transformation between the two spaces to provide pixel coordinates and color values for each pixel of each primitive. The end result of this is that the rasterizer outputs a sequence red/green/blue color values (conventionally referred to as diffuse color values) for each pixel of each primitive.

One or more of the vertex processor, the rasterizer, and a texture processor compute texture coordinates for each pixel of each primitive. The texture coordinates of each pixel of a primitive vary linearly along lines through the primitive in world space. Thus, texture coordinates of a pixel at any position in the primitive can be determined in world space (from the texture coordinates of the vertices) by a process of perspective transformation, and the texture coordinates of each pixel to be displayed on the display screen can be determined. A texture processor can use the texture coordinates (of each pixel to be displayed on the display screen) to index into a corresponding texture map to determine texels (texture color values at the position defined by the texture coordinates for each pixel) to vary the diffuse color values for the pixel. Often the texture processor interpolates texels at a number of positions surrounding the texture coordinates of a pixel to determine a texture value for the pixel. The end result of this is that the texture processor generates data determining a textured version of each pixel (of each primitive) to be displayed on the display screen.

A texture map typically describes a pattern to be applied to a primitive to vary the color of each pixel of the primitive in accordance with the pattern. The texture coordinates of the vertices of the primitive fix the position of the vertices of a polygon on the texture map and thereby determine the texture detail applied to each of the other pixels of the primitive in accordance with the pattern.

FIG. 1 is a block diagram of a pipelined graphics processing system that can embody the present invention. Preferably, the FIG. 1 system is implemented as an integrated circuit (including other elements not shown in FIG. 1). Alternatively at least one portion (e.g., frame buffer 50) of the FIG. 1 system is implemented as a chip (or portion of a chip) and at least one other portion thereof (e.g., all elements of FIG. 1 other than frame buffer 50) is implemented as another chip (or portion of another chip). Vertex processor 10 of FIG. 1 generates vertex data indicative of the coordinates of the vertices of each primitive (typically a triangle) of each image to be rendered, and attributes (e.g., color values) of each vertex.

Rasterizer 20 generates pixel data in response to the vertex data from processor 10. The pixel data are indicative of the coordinates of pixels for each primitive, and attributes of each pixel (e.g., color values for each pixel and values that identify one or more textures to be blended with each set of color values). Rasterizer 20 asserts the pixel data to pixel shader 30.

Typically, pixel shader 30 combines the pixel data received from rasterizer 20 with texture data and may execute shader programs. For example, one or more texture maps (and a set of texels of each texture map), or no texture maps, are specified for each pixel, and pixel shader 30 implements an algorithm to generate a texel average in response to the specified texels of each texture map (by retrieving the texels from memory 25 coupled to pixel shader 30 and computing an average of the texels of each texture map) and to generate textured pixel data by combining the pixel with each of the texel averages. In typical implementations, pixel shader 30 can perform various operations in addition to (or instead of) texturing each pixel, such as one or more of the well known operations of format conversion, input swizzle (e.g., duplicating and/or reordering an ordered set of components of a pixel), scaling and biasing, inversion (and/or one or more other logic operations), clamping, and output swizzle.

When pixel shader 30 has completed all required processing operations on a quantity of pixel data, it asserts the updated (e.g., textured and/or programmably shaded) pixel data to pixel processor 40, and pixel processor 40 performs additional processing on the updated data. In variations on the system of FIG. 1, pixel processor 40 is omitted. In this case, pixel shader 30 is coupled directly to frame buffer 50, pixel shader 30 performs all required processing of the pixels generated by rasterizer 20, and pixel shader 30 is configured to assert the fully processed pixels to frame buffer 50. Pixel processor 40 and/or pixel shader 30 typically include the OpenGL® "fragment operations."

Although pixel shader 30 is sometimes referred to herein as a "texture processor," in typical implementations it can perform various operations in addition to (or instead of) texturing each pixel, such as one or more of the conventional operations of culling, frustum clipping, polymode operations, polygon offsetting, and fragmenting. Alternatively, texture processor 30 performs all required texturing operations and pixel processor 40 performs some or all required non-texturing operations for each pixel.

In typical implementations of pipelined (and other) graphics processors, there is a need to perform reciprocal and reciprocal square root operations (as well as other mathematical operations) on data values. Such operations are commonly performed in vertex processing, pixel shading, and pixel processing units of graphics processors.

Reciprocal and reciprocal square root functions having typically been implemented in hardware using variations of the conventional technique known as Newton-Rapheson iteration. However, the inventors have recognized that generation of the reciprocal (or the reciprocal of the square root) of an input value in pipelined fashion using Newton-Rapheson iteration would require pipelined processing circuitry having an undesirably large number of pipeline stages and an undesirably large footprint (in the case that the processing circuitry is implemented as an integrated circuit or portion of an integrated circuit).

SUMMARY OF THE INVENTION

In accordance with the invention, the reciprocal (or the reciprocal of the square root) of an input value is generated in pipelined fashion in hardware by generating a piecewise quadratic Taylor's series approximation of the desired output value. The piecewise quadratic implementation of reciprocal and reciprocal square root reduces both the pipeline stage latency and the overall silicon area compared to the Newton-Rapheson implementation. For floating point numbers using IEEE 23-bit precision mantissas (IEEE single-precision floating point numbers), the pipeline latency can be reduced by a factor of two (3 cycles vs. 6 cycles) and the overall area can be reduced by 15%.

In a class of embodiments, the invention is a pipelined circuit configured to generate a Taylor's series approximation of at least one and preferably both of the reciprocal and the reciprocal of the square root of an input value. In some such embodiments, the input value is a floating point number having mantissa "x," and the mantissa of the output value has form $A-Bx+Cx^2$, where A, B, and C are predetermined Taylor's series coefficients. A pipelined processor (e.g., a pipelined graphics processor) can include the inventive pipelined circuit.

All embodiments of the inventive circuit (and processor) are pre-loaded with, or include circuitry for generating, a set of Taylor's series coefficients for each of multiple segments of the input value range. Preferably the range of an input "x" (which can but need not be a mantissa of a floating point word) is partitioned into N segments, "x" is in the "n"th segment when $x_{n-1} < x \leq x_n$, with $1 \leq n \leq N$, and a set of coefficients $A_n$, $B_n$, and $C_n$ is predetermined for each segment. In order for the circuit to generate the value $f(x)=A^n-B_nx+C_nx^2$ when the input x is in the "n"th segment, the coefficients $A_n$, $B_n$, and $C_n$ for each segment are predetermined by fitting the curve $f(x)=A_n-B_nx+C_nx^2$ (for x in the relevant segment) to the ideal function curve $f_{ideal}(x)=A-Bx+Cx^2$. Preferably, a best combination of the number of segments of the input value range, specific values of coefficients $A_n$, $B_n$, and $C_n$ for all values of "n," and word length of the quantity $x^2$ to be multiplied by the coefficient $C_n$ is determined by such curve fitting subject to the constraints that the circuit using the coefficients has minimized (or acceptably small) size and that the error in the output value is acceptably small. The number of bits of each coefficient can determine the width of one or more read-only memories (ROMs) for storing them, the number of distinct segments of the input value range can determine the depth of each ROM, and the number of bits of the value $C_nx^2$ can determine the size of a multiplier that generates the quantity $x^2$.

In preferred embodiments in which the output value has a mantissa of form $A_n-B_nx+C_nx^2$, where $A_n$, $B_n$, and $C_n$ are Taylor's series coefficients, the inventive circuit includes three ROMs: one storing the coefficients $A_n$ for all segments of the range of x, another storing the coefficients $B_n$, and a third storing the coefficients $C_n$. Optionally, the circuit also includes an error ROM for determining a correction value (e.g., a correction bit) for each input value or each segment of an input value range. If the circuit includes such an error ROM, it can achieve the same accuracy as a CPU; without the error ROM it can achieve such accuracy of plus or minus one LSB. Typically, the circuit has a latency of three clock cycles (one for asserting the coefficients $A_n$, $B_n$, and $C_n$ and a truncated version of $x^2$, another for determining $B_nx$ and $C_nx^2$, and a third for determining $A_n-B_nx+C_nx^2$ (minus the correction bit from the error ROM, optionally) in contrast with the 6-cycle latency of a conventional pipelined circuit. Preferably, the inventive circuit is configured to determine both the reciprocal and the reciprocal of the square root of the input value, and generates an output value in response to the input value and a control word, where the output value is a Taylor's series approximation of the input value's reciprocal when the control word has a first value and the output value is a Taylor's series approximation of the reciprocal of the input value's square root when the control word has a second value. Additional functions can be selected (in response to other values of the control word) if corresponding coefficient tables are stored in the circuit. In variations, the predetermined coefficients are otherwise stored (e.g., in random access memories) or generated by preconfigured circuitry (which can include gate arrays).

In preferred embodiments, the invention is a pipelined circuit in which a set of ROMs (having specific depths and bit widths) stores Taylor's series coefficients for processing input values having floating point format, and a system (e.g., a pipelined graphics processor) including such a circuit. The circuit has a pipeline stage including the set of ROMs (which are preloaded with coefficient values for each term of the approximation of the output word's mantissa) and a multiplier for computing a truncated version of the square of the input value's mantissa. Each ROM preferably has a depth in the range from 128 to 512 bits. In some such embodiments that are configured to process an input value having IEEE floating point format with 23-bit mantissa, "x", including by generating a 23-bit value $A_n-B_nx+C_nx^2$, where "n" denotes that x is in the "n"th of N segments of its range, the multiplier outputs a 28-bit value and there are three ROMs (each having depth 256 bits): a first ROM having 26-bit width storing $A_1$ coefficients; a second ROM having 19-bit width storing $B_i$ coefficients, and a third ROM having 13-bit width storing $C_1$ coefficients.

Another aspect of the invention is a method for determining optimal (or preferred) parameters for elements of a pipelined circuit (or pipelined processor including such a circuit) to include at least one pipeline stage having at least one ROM preloaded with Taylor's series coefficients, a pipelined circuit designed in accordance with such a method, and a pipelined processor including a circuit designed in accordance with such a method. The optimization minimizes the circuit's size (footprint) subject to the constraints that the input and output values have specified format and the output has no more than specified error. The method assumes a specific function (e.g., a reciprocal, reciprocal square root, sine, cosine, or other function) to be approximated using the coefficients and a specific degree for the Taylor's approximation (e.g., a degree of two for a quadratic approximation), but allows variation of such parameters as the length (number of bits) of each coefficient and each generated quantity $x^n$ (where x is an input value or truncated input value), and the number of segments of the input value range (each segment having a different set of coefficients). For example, the method can assume generation of the quantity $A_n - B_n x + C_n x^2$ in response to each input value x in an "n"th segment of the input value range, and can determine a combination of the number of segments of the input value range, the specific coefficients $A_n$, $B_n$, and $C_n$, for each segment, and the word length of the quantity $x^2$ multiplied with each coefficient $C_n$, that minimize the circuit's size subject to given constraints on the format of each input and output value and on maximum allowable error for an output value. Thus, the method can determine an optimal (or preferred) combination of the word length of the output value of a multiplier for computing the quantity $x^2$ (i.e., the number of output bits effectively truncated by the multiplier), the width of each ROM that stores coefficients (determined by the word length of each coefficient value stored therein), and the depth of each ROM (the number of segments of the input value range for the relevant term of the Taylor's approximation). For a processor to generate an approximation (whose mantissa has form $A_n - B_n x + C_n x^2$) of either the reciprocal or reciprocal square root of an input value having IEEE floating point format with 23-bit mantissa "x," where the processor has a first ROM for the coefficients $A_i$, a second ROM for coefficients $B_i$, a third ROM for the coefficients $C_i$, and a multiplier for generating the quantity $x^2$, the method determines a preferred parameter set specifying that each ROM has 256 bit depth (for storing coefficients for 128 different input value ranges for computing the reciprocal of the input value, for 64 different input value ranges for computing the reciprocal square root of each input value having even exponent, and for 64 different input value ranges for computing the reciprocal square root of each input value having odd exponent), the first ROM has 26-bit width, the second ROM has 19-bit width, the third ROM has 13-bit width, and the multiplier outputs a 28-bit value (effectively truncating 18 bits). For a similar processor for processing input values having floating point format with 16-bit mantissas, including an error ROM in addition to a multiplier, first ROM for $A_i$ coefficients, second ROM for $B_i$ coefficients, and third ROM for $C_i$ coefficients, the method determines a preferred parameter set specifying that each ROM has 512 bit depth (for storing coefficients for 256 different input value ranges for computing the reciprocal of the input value, for 128 different input value ranges for computing the reciprocal square root of each input value having even exponent, and for 128 different input value ranges for computing the reciprocal square root of each input value having odd exponent), the first ROM, second ROM, and third ROM have 24-bit, 16-bit, and 8-bit width, respectively, and the multiplier outputs an 8-bit value (the multiplier receives only the eight most significant bits of the input value and effectively truncates 8 bits of its output). The method searches the parameter space (including the number of bits of each coefficient), which maps to circuit area, for the set of parameters that: (1) can be implemented with the smallest estimated circuit area; and (2) causes all results generated by the pipelined processor to be within 1 LSB accuracy of the ideal result (or some other accuracy measure). The search of the parameter space is optionally done first on a coarse resolution (i.e., not checking every possible parameter value) and then on a fine resolution using the best range found by the coarse search.

Another aspect of the invention is a system for pipelined graphics data processing, including any embodiment of the inventive circuit. For example, the system can include vertex processor (including a triangle setup module), a rasterizer, and a pixel shader. One or more of the components of the system (e.g., both the triangle setup module and the pixel shader) can include the inventive circuit.

Other aspects of the invention are methods for pipelined processing of graphics data to generate an output word in response to an input word of the data, where the input word is indicative of an input value and such that the output word is indicative of a Taylor's series approximation of at least one of the input value's reciprocal and the reciprocal of the square root of the input value.

DETAILED DESCRIPTION OF THE PREFERRED EMBODIMENT

Figure 1:
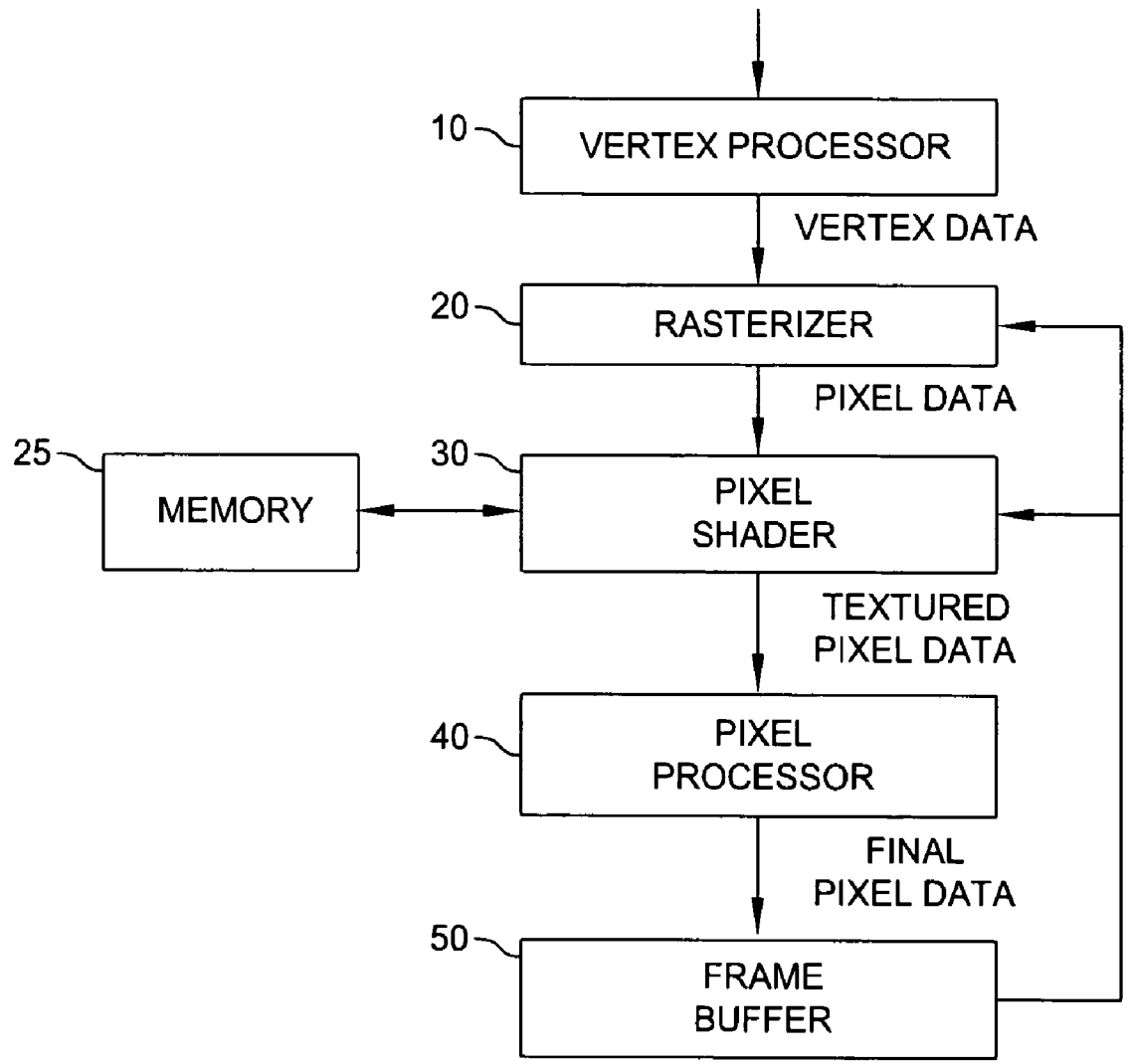
FIG. 1 is a block diagram of a pipelined graphics processor that can embody the invention.

The pipelined graphics processing system of FIG. 1 can embody the present invention. The inventive circuitry for determining an input value's reciprocal (and/or the reciprocal of its square root) can be implemented in one or more elements of the system, such as each of vertex processor 10 (typically in a triangle setup module of vertex processor 10), pixel shader 30, and pixel processor 40.

Figure 2:
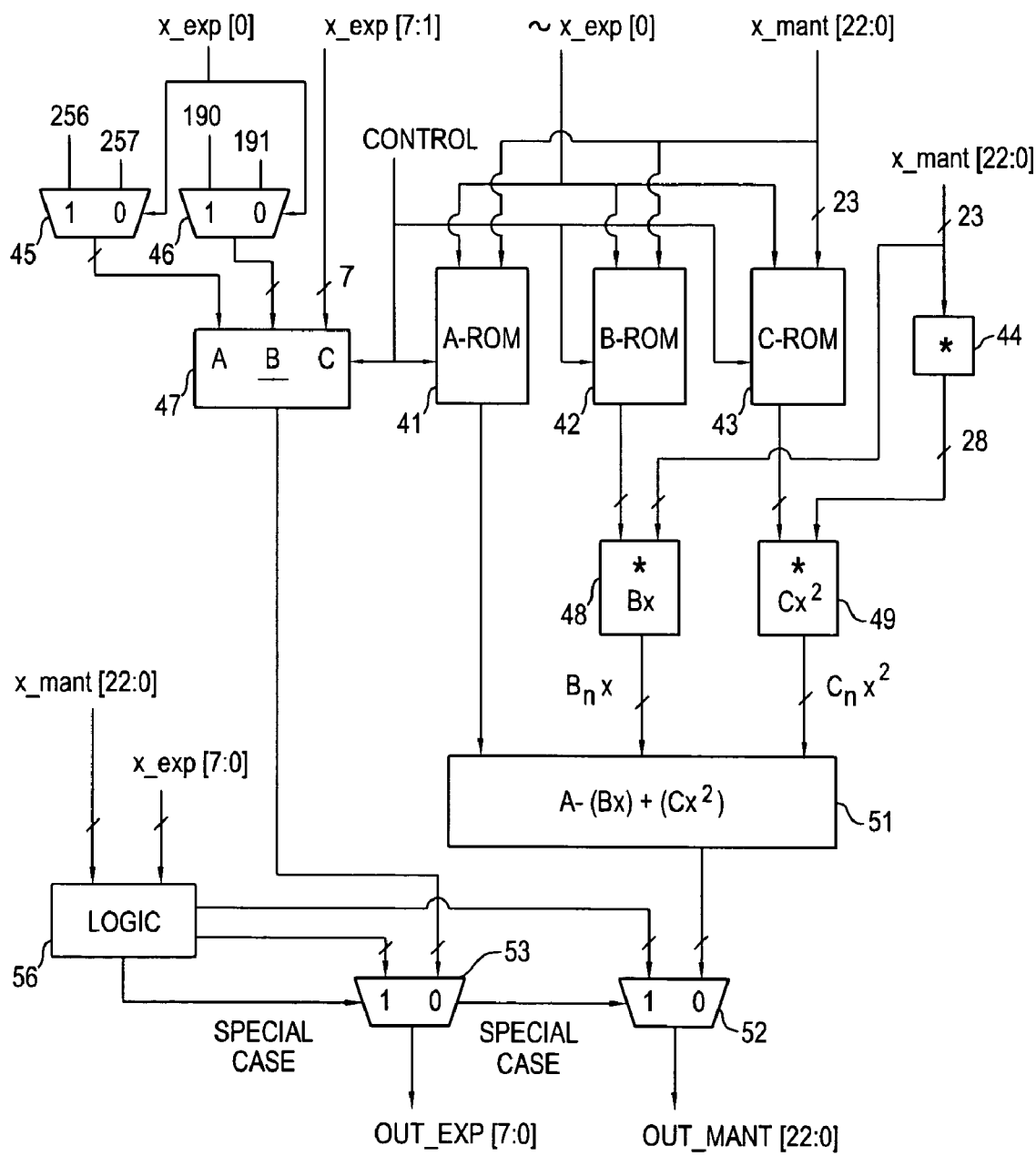
FIG. 2 is a block diagram of a preferred embodiment of the inventive pipelined circuit.

With reference to FIG. 2, we next describe a pipelined circuit that embodies the invention and can be included in any of vertex processor 10, pixel shader 30, and pixel processor 40 of FIG. 1. The circuitry of FIG. 2 is typically implemented as part of a graphics processing chip that includes numerous components (not shown) in addition to those shown in FIG. 2. The components that are shown in FIG. 2 comprise a pipelined circuit that embodies the invention. The pipelined circuit of FIG. 2 is configured to generate, in response to an input value ("x") and a control word ("Control"), an output value ("Output") that is a Taylor's series approximation of the reciprocal of the square root of the input value when the control word has a first value, and a Taylor's series approximation of the input value's reciprocal when the control word has a second value. The input value "x" has IEEE floating point format, with a 23-bit mantissa (x_mant[22:0], whose least-significant bit is x_mant[0]), an 8-bit exponent (x_exp[7:0], whose least-significant bit is x_exp[0]), and a sign bit. The output value also has IEEE floating point format, with a 23-bit mantissa (out_mant[22:0]), an 8-bit exponent (out_exp[7:0]), and a sign bit.

The circuit causes the output value's sign bit to equal the input value's sign bit when the circuit implements the "reciprocal" function. The following description assumes that the input value's sign bit is 0 (indicating that the input value is positive) when the circuit implements the "reciprocal of the square root" function. Preferably, the circuit includes logic that recognizes when the input value's sign bit is 1 (indicating that the input value is negative) at a time when the control word has the first value (indicating that the output value is to approximate the reciprocal of the input value's square root), and causes the circuit to output an indication of an invalid operation (rather than a valid output value) in this case.

The FIG. 2 circuit includes ROM 41 (having 26-bit width) which stores 256 Taylor's series coefficients $A_i$, each of which is a 26-bit value, ROM 42 (having 19-bit width) which stores 256 $B_i$ coefficients, each of which is a 19-bit value), ROM 43 (having 13-bit width) which stores 256 $C_i$ coefficients, each of which is a 13-bit value), multiplication units 44, 48, and 49, multiplexers 45, 46, 52, and 53, subtraction unit 47, math unit 51 (a multiply/add unit), and logic unit 56, connected as shown.

Some of the coefficients (128 of them in a preferred implementation) stored in each of ROMs 41, 42, and 43 are used to compute the reciprocals of input values, and the other coefficients stored in each of ROMs 41, 42, and 43 are used to compute the reciprocals of input values' square roots. In a preferred implementation, each of ROMs 41, 42, and 43 stores sixty-four coefficients (one for each of sixty-four different input value ranges) for computing the reciprocal square roots of input values having even exponents, and sixty-four coefficients (one for each of sixty-four different input value ranges) for computing the reciprocal square roots of input values having odd exponents, and 128 coefficients (one for each of 128 different input value ranges) for computing the reciprocals of input values (having either even or odd exponents). The control word ("Control") and the bit indicating whether the input value's exponent is even or odd, asserted to each of ROMs 41, 42, and 43, determine whether the coefficient read from each memory is for computing the reciprocal (or the reciprocal square root) of an input value, and if it is for computing the reciprocal square root, whether the coefficient is for processing an input value having even (or odd) exponent. Preferably, the coefficients stored in ROMs 41, 42, and 43 are predetermined in the manner described below.

The FIG. 2 circuit has a latency of three clock cycles. In a first clock cycle, the input value's mantissa and the control word are asserted to each of ROMs 41, 42, and 43 and 64 and each of multiplication circuits 44 and 48, a signal indicative of whether the input value's exponent is even or odd is asserted to each of ROMs 41, 42, and 43, and the mantissa and exponent of the input value are asserted to logic unit 56. In response, a 26-bit value indicative of a coefficient $A_n$ is asserted from ROM 41 to math unit 51, a 19-bit value indicative of a coefficient $B_n$ is asserted from ROM 42 to multiplier 48, and a 13-bit value indicative of a coefficient $C_n$ is asserted from ROM 43 to multiplier 49. The coefficient values are selected from among those for approximating the input value's reciprocal when the control word has a first value, the coefficient values are selected from among those for approximating the reciprocal of the square root of an input value having even exponent when the control word has a second value and the input value has an even exponent, and the coefficient values are selected from among those for approximating the reciprocal of the square root of an input value having odd exponent when the control word has the second value and the input value has an odd exponent. Also, multiplier 44 generates a truncated version (a 28-bit value) of the square of the input value's mantissa and asserts this value to multiplier 49. Optionally also, control bits are asserted from logic unit 56 to math unit 51.

In a second clock cycle, multiplier 48 multiplies the input value's mantissa with the coefficient $B_n$ to generate the value "$B_n x$" and multiplier 49 multiplies the output of multiplier 44 (indicative of $x^2$, the square of the input value mantissa) by the coefficient $C_n$ to generate the value "$C_n x^2$."

In a third clock cycle, math unit 51 generates a 23-bit value indicative of $f(x)=A_n-B_n x+C_n x^2$, which is the mantissa of the desired approximation of the reciprocal (or the reciprocal of the square root) of input value x. The output value f(x) is asserted to a first input of multiplexer 52. Unless a special case exists, the "special case" control bit from logic unit 56 causes multiplexer 52 to pass through the output value f(x) as the output value's mantissa "out_mant[22:0]."

The FIG. 2 circuit employs multiplexers 45 and 46 and subtraction unit 47 to generate the output value's exponent "out_mant[7:0]." The least significant bit ("x_exp[0]") of the input value's exponent is asserted as a control bit to each of multiplexers 45 and 46. In response, multiplexer 45 passes to a first input of unit 47 an 8-bit word indicative of either the value "256" (if x_exp[0]=1) or the value "257" (if x_exp[0]=0), and multiplexer 46 passes to a second input of unit 47 an 8-bit word indicative of either the value "190" (if x_exp[0]=1) or the value "191" (if x_exp[0]=0). The seven other bits of the input value's exponent are asserted to the third input of unit 47. Depending on the value of the control word, unit 47 subtracts the value it its third input from either the value at its first input (when the control word has the first value) or the value at its second input (when the control word has the second value) to generate an 8-bit word which is the exponent of the desired approximation of the reciprocal (or the reciprocal of the square root) of the input value, unless a special case exists. Unit 47 asserts this 8-bit word to a first input of multiplexer 53. Unless a special case exists, the "special case" control bit from logic unit 56 causes multiplexer 53 to pass through the 8-bit word from unit 47 as the exponent "out_exp[7:0]" of the output value.

Logic unit 56 is configured for handling special cases, and is coupled to receive the mantissa and exponent of the input value x. When logic unit 56 determines that the input value is not a valid number (i.e., that "x" is an "NaN" value rather than a floating point number), it asserts (to a second input of multiplexer 52) a 23-bit value and (to a second input of multiplexer 53) an eight-bit value that together indicate that "x" is an "NaN" value, and asserts to both multiplexers 52 and 53 a "special case" control bit causing the multiplexers to pass through these two values as the mantissa and exponent, respectively, of the output value. When unit 56 determines that the input value is zero, it asserts to the second input of multiplexer 52 a 23-bit value and to the second input of multiplexer 53 an eight-bit value that together indicate that the reciprocal of the square root of "x" is infinity (or that computing the reciprocal of the square root of "x" is an illegal operation), and asserts to multiplexers 52 and 53 a special case control bit causing the multiplexers to pass through these two values as the output value. When unit 56 determines that the input value is an infinite value, it asserts to the second input of multiplexer 53 a 23-bit value and to the second input of multiplexer 53 an eight-bit value that together indicate that that the reciprocal of the square root of "x" is zero (or that computing the reciprocal of the square root of "x" is an illegal operation), and asserts to multiplexers 52 and 53 a special case control bit causing the multiplexers to pass through these two values as the output value.

Variations on the FIG. 2 embodiment employ circuitry configured to generate the appropriate Taylor's series coefficients in response to the input value's mantissa (and a control word indicative of the function to be implemented on the input value) rather than ROMs or other memories (such as random access memories) into which the coefficients are pre-loaded. The coefficient-generating circuitry can include logic circuitry, gates, and/or transistor circuits.

Figure 4:
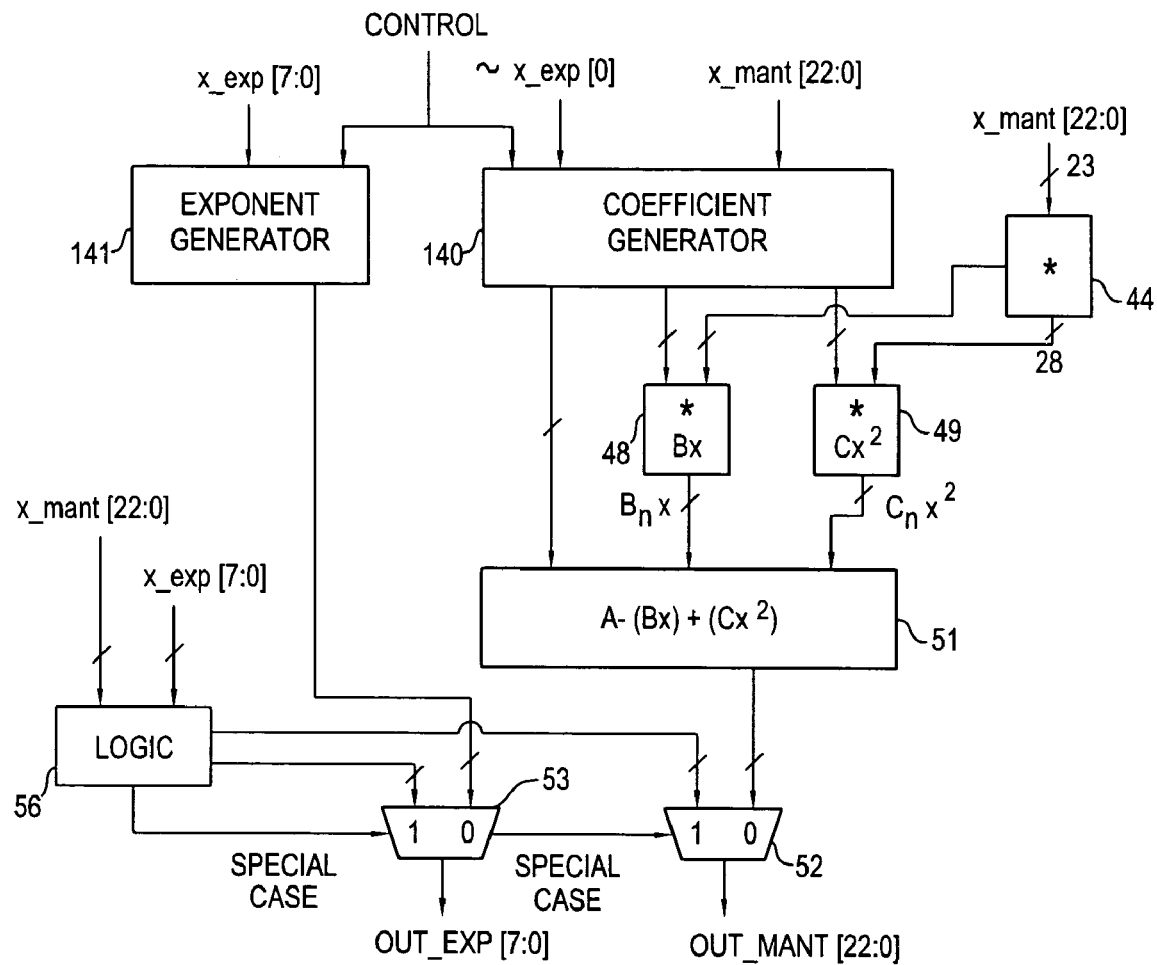
FIG. 4 is a block diagram of an alternative embodiment of the inventive pipelined circuit.

For example, the circuit of FIG. 4 is a variation on the FIG. 2 circuit in which coefficient generation circuitry 140 replaces ROMs 41, 42, and 42, and exponent generation circuitry 141 replaces elements 45, 46, and 47. With coefficient generation circuitry 140 configured to generate and assert the same coefficients that are asserted by ROMs 41, 42, and 42 in response to the same input values and control word, and exponent generation circuitry 141 configured to assert the same exponent as does element 47 (in response to the same input and control word), the other elements of FIG. 4 can be identical to the identically numbered elements of FIG. 2. Thus, the above description of these elements will not be repeated with reference to FIG. 4. Elements 140 and 141 are preferably hardwired but are optionally implemented so as to be programmable.

In all embodiments of the inventive circuit, the circuit is pre-loaded with, or includes circuitry for generating, a predetermined set of Taylor's series coefficients for performing an approximation (which can have either zero or nonzero error) of a desired function (e.g., a reciprocal, reciprocal square root, sine, cosine, or other function) on an input value. The Taylor's series approximation of the function can have any degree, and can employ different sets of coefficients (each set comprising "n+1" coefficients, when the approximation has degree "n") for input values in different value ranges.

In preferred embodiments, the inventive circuit implements a piecewise quadratic Taylor's series approximation, $f(x)=A_n-B_n x+C_n x^2$, of an input value x. The range of x is partitioned into N segments, x is in the "n"th segment when $x_{n-1} < x \leq x_n$, with $1 \leq n \leq N$, and a set of coefficients $A_n$, $B_n$, and $C_n$ for each segment is predetermined by fitting a curve $f(x)=A_n-B_n x+C_n x^2$ (for x in the segment) to the ideal function curve $f_{ideal}(x)=A-Bx+Cx^2$. Preferably, the best combination of coefficients $A_n$, $B_n$, and $C_n$ for all values of "n," a total number of segments, and a word length of the quantity $x^2$ to be multiplied by $C_n$, is determined by such curve fitting subject to the constraints that the circuit using the coefficients has acceptably small size and that the error in the output value is acceptably small. The number of bits of each coefficient can determine the width of a read-only memory (ROM) for storing it, the number of distinct segments can determine the depth of each ROM for storing coefficients, and the number of bits of the value $C_n x^2$ can determine the size of a multiplier that generates $x^2$. In identifying the best values of the relevant parameters, the number of bits of each coefficient is mapped to the width of the ROM for storing it, the number (N) of distinct segments is mapped to the depth of each ROM for storing components of one term of the Taylor's series approximation (the $A_n$, $B_n$, or $C_n$ components), and the number of bits of the value $x^2$ is mapped to the size of the circuitry (e.g., a multiplier) that generates $x^2$.

In a class of embodiments, the inventive circuit is configured to implement a Taylor's series approximation of each of at least two functions ($f_1(x)$ and $f_2(x)$) on an input value. Each circuit can be configured to approximate additional functions ($f_3(x)$, $f_4(x)$, etc., in addition to $f_1(x)$ and $f_2(x)$) by predetermining a set of Taylor's series coefficients for each additional function, and storing the predetermined coefficients in ROMs or configuring the circuit to generate coefficients from each predetermined set.

Figure 3:
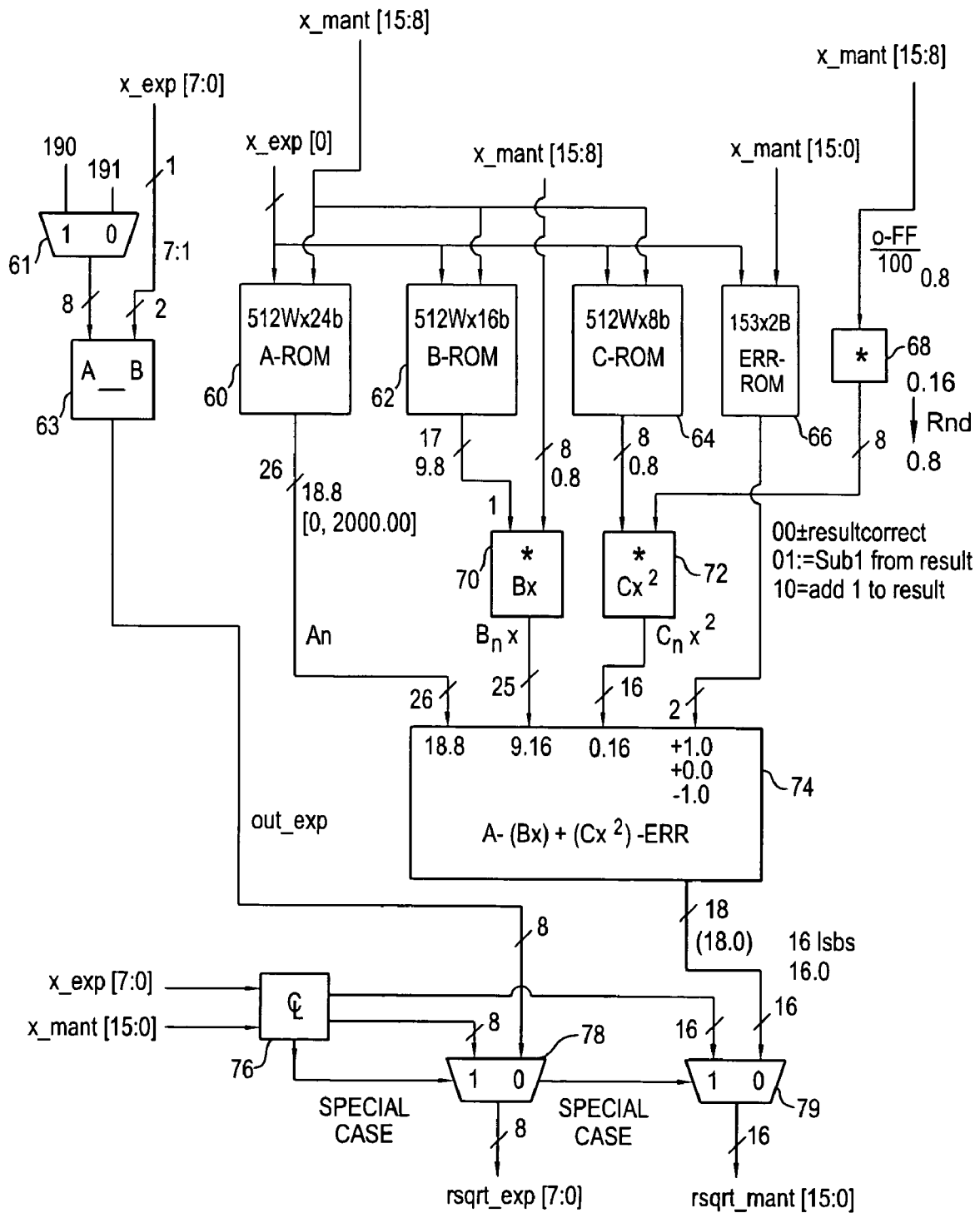
FIG. 3 is a block diagram of an alternative embodiment of the inventive pipelined circuit.

Another embodiment of a circuit implemented in accordance with the invention to implement a Taylor's series approximation of the reciprocal of the square root of the input value is that shown in FIG. 3. The circuitry of FIG. 3 is included in a graphics processing chip which, in typical implementations, includes numerous components (not shown) in addition to those shown. The components of the chip that are shown in FIG. 3 comprise a pipelined circuit that embodies the invention.

The pipelined circuit of FIG. 3 is configured to respond to an input value ("x") by asserting an output value ("rsqrt") that is a Taylor's series approximation of the reciprocal of the square root of the input value. The input value "x" has floating point format, with a 16-bit mantissa ("x_mant[15:0]," whose least-significant bit is x_mant[0]), an 8-bit exponent ("x_exp[7:0]," whose least-significant bit is x_exp[0]), and a sign bit. The output value "rsqrt" also has floating point format, with a 16-bit mantissa ("rsqrt_mant[15:0]," an 8-bit exponent ("rsqrt_exp[7:0]"), and a sign bit. The following description assumes that the input value's sign bit is 0 (indicating that the input value is positive). Preferably, the circuit includes logic that recognizes when the input value's sign bit is 1 (indicating that the input value is negative) and causes the circuit to output an indication of an invalid operation (rather than a valid output value) in this case.

The FIG. 3 circuit includes ROM 60 (having 24-bit width) which stores 512 Taylor's series coefficients $A_i$, each of which is a 24-bit value, ROM 62 (having 16-bit width) which stores 512 $B_i$ coefficients, each of which is a 16-bit value), ROM 64 (having 8-bit width) which stores 512 $C_i$ coefficients, each of which is an 8-bit value), error ROM 66, multiplication units 68, 70, and 72, multiplexers 61, 78, and 79, subtraction unit 63, math unit 74, and logic unit 76, connected as shown.

In some implementations of the FIG. 3 circuit, only 256 of the coefficients stored in each of ROMs 60, 62, and 64 are used to compute the reciprocal of each input value's square root. For example, 256 coefficients stored in each of ROMs 60, 62, and 64 (for computing the reciprocal of each input value's square root) can comprise two subsets: a first subset for each of 128 different ranges of input mantissa values (for input words having even exponents); and a second subset for each of 128 different ranges of input mantissa values (for input words having odd exponents). In other implementations of the FIG. 3 circuit, 512 coefficients stored in each of ROMs 60, 62, and 64 are used to compute the reciprocal of each input value's square root, with the coefficients stored in each ROM comprising two subsets: a first subset for each of 256 different ranges of input mantissa values (for input words having even exponents); and a second subset for each of 256 different ranges of input mantissa values (for input words having odd exponents).

In all implementations of FIG. 3, the coefficients are preferably are predetermined in the manner described above with reference to FIG. 2.

In implementations of the FIG. 3 circuit in which only 256 coefficients stored in each of ROMs 60, 62, and 64 are used to compute the reciprocal of each input value's square root, another set of 256 coefficients is typically stored in each of ROMs 60, 62, and 64 for use in computing the reciprocal of each input value. In such typical implementation, the circuit operates in response to a control signal that determines whether to compute the reciprocal (or reciprocal of the square root) of each input value, and the circuit includes circuitry (not shown in FIG. 3) for use in generating either the reciprocal or the reciprocal of the square root of each input value.

Still with reference to FIG. 3, error ROM 66 (having 153-bit depth and two-bit width) stores a set of correction words, each comprising two bits and being indicative of a correction bit having the value 0, +1, or −1. The words stored in ROM 66 are predetermined with knowledge of the error that would result from processing (without any correction bit) each input value in the FIG. 3 circuit with the set of $A_n$, $B_n$, and $C_n$ coefficients (stored in ROMs 60, 62, and 64) for the segment of the input value range that includes the input value. In response to the mantissa of each input value "x" (and a signal indicative of whether the input value's exponent is even or odd), error ROM 66 asserts a two-bit word indicative of a correction bit to be subtracted (in unit 74) from the value $A_n - B_n x + C_n x^2$ generated by unit 74. By including error ROM 66 and providing correction bits to math unit 74, the FIG. 3 circuit can assert the output value's mantissa with the same accuracy as can a conventional CPU.

The FIG. 3 circuit has a latency of three clock cycles. In a first clock cycle, the eight most significant bits of the input value's mantissa are asserted to each of ROMs 60, 62, and 64 and each of multiplication circuits 68 and 70, a signal indicative of whether the input value's exponent is even or odd is asserted to each of ROMs 60, 62, and 64, and the mantissa and exponent of the input value are asserted to logic unit 76. In response, a 26-bit value (indicative of the 24-bit coefficient $A_n$ concatenated with two control bits from logic unit 76) is asserted from ROM 60 to math unit 74, a 17-bit value (indicative of the 16-bit coefficient $B_n$ concatenated with a control bit from logic unit 76) is asserted from ROM 62 to multiplier 70, and the coefficient $C_n$ is asserted from ROM 64 to multiplier 72. Also, multiplier 68 generates an 8-bit value indicative of a truncated version of the square of the input value mantissa and asserts this value to multiplier 72.

In a second clock cycle, multiplier 70 multiplies the eight most significant bits of the input value's mantissa with the coefficient $B_n$ to generate the 25-bit value "$B_n x$" and multiplier 72 multiplies the output of multiplier 68 (indicative of the square of the input value's mantissa) with the coefficient $C_n$ to generate the 16-bit value "$C_n x^2$."

In a third clock cycle, math unit 74 generates a 16-bit value indicative of $f(x) = A_n - B_n x + C_n x^2 -$ (the correction bit from error ROM 66), which is the mantissa of the desired approximation of the reciprocal of the square root of input value x. In some implementations, a rounding bit may need to be added to the other terms to generate the output value f(x). The output value f(x) is asserted to a first input of multiplexer 79. Unless a special case exists, the "special case" control bit from logic unit 76 causes multiplexer 79 to pass through the output value f(x) as the mantissa "rsqrt_mant[15:0]" of the output value "rsqrt."

The FIG. 3 circuit employs multiplexer 61 and subtraction unit 63 to generate the exponent "rsqrt_mant[7:0]" of the output value "rsqrt." The least significant bit of the input value's exponent is asserted as a control bit to multiplexer 61. In response, multiplexer 61 passes to a first input of unit 63 an 8-bit word indicative of either the value "190" (if the least significant bit of the input value's exponent is one) or the value "191" (if the least significant bit of the input value's exponent is zero). The seven other bits of the input value's exponent are asserted to the second input of unit 63.

Unit 63 subtracts the value at its second input from the value at its first input to generate an 8-bit word "out_exp" which is the exponent of the desired approximation of the reciprocal of the square root of input value x. The word "out_exp" is asserted to a first input of multiplexer 78. Unless a special case exists, the "special case" control bit from logic unit 76 causes multiplexer 78 to pass through the word out_exp as the exponent "rsqrt_exp[7:0]" of the output value "rsqrt."

Logic unit 76 is provided for handling special cases, and is coupled to receive the mantissa and exponent of the input value x. When logic unit 76 determines that the input value is not a valid number (i.e., that "x" is an "NaN" value rather than a floating point number), it asserts to a second input of multiplexer 79 a sixteen-bit value and to a second input of multiplexer 78 an eight-bit value that together indicate that "x" is an "NaN" value, and asserts to both multiplexers 78 and 79 a "special case" control bit causing the multiplexers to pass through these two values as the mantissa and exponent, respectively, of the output value "rsqrt." When unit 76 determines that the input value is zero, it asserts to the second input of multiplexer 79 a sixteen-bit value and to the second input of multiplexer 78 an eight-bit value that together indicate that the reciprocal of the square root of "x" is infinity (or that computing the reciprocal of the square root of "x" is an illegal operation), and asserts to multiplexers 78 and 79 a special case control bit causing the multiplexers to pass through these two values as the output value "rsqrt." When unit 76 determines that the input value is an infinite value, it asserts to the second input of multiplexer 79 a sixteen-bit value and to the second input of multiplexer 78 an eight-bit value that together indicate that that the reciprocal of the square root of "x" is zero (or that computing the reciprocal of the square root of "x" is an illegal operation), and asserts to multiplexers 78 and 79 a special case control bit causing the multiplexers to pass through these two values as the output value "rsqrt."

In a broad class of preferred embodiments, including preferred implementations of both the FIG. 2 and FIG. 3 circuits, the invention is a pipelined circuit in which a set of ROMs (having specific depths and bit widths) stores Taylor's series coefficients for processing input values having floating point format. In another broad class of embodiments, the invention is a pipelined graphics processor (or other system) including such a circuit. Each such circuit has a pipeline stage including the set of ROMs (which are preloaded with coefficient values for each term of a Taylor's series approximation that determines the output word's mantissa) and a multiplier for computing a truncated version of the square of the input value's mantissa.

In this class of embodiments, each ROM preferably has a depth in the range from 128 to 512 bits. For example, for one such circuit that generates an output word mantissa having form $A_n - B_p x + C_q x^2$, where "x" is the mantissa of the input value mantissa (or a truncated version thereof), $A_n$ is a coefficient of a first coefficient set, $B_p$ is a coefficient of a second coefficient set, and $C_q$ is a coefficient of a third coefficient set, and $1 \leq n \leq N_1$, $1 \leq p \leq N_2$, and $1 \leq q \leq N_3$, the circuit can have a pipeline stage that includes a first ROM preloaded with $N_1$ different ones of the coefficients $A_n$, a second ROM preloaded with $N_2$ different ones of the coefficients $B_p$, and a third ROM preloaded with $N_3$ different ones of the coefficients $C_q$, where $N_1$, $N_2$, and $N_3$ preferably satisfy $128 \leq N_1 \leq 512$, $128 \leq N_2 \leq 512$, and $128 \leq N_3 \leq 512$. Some embodiments in the class are configured to process input values having IEEE floating point format with 23-bit mantissas, and have three ROMs each having depth 256 bits. Other ones of the embodiments have two ROMs or more than three ROMs. In one preferred embodiment configured to process an IEEE floating point input value having 23-bit mantissa "x," including by generating a 23-bit value $A^n - B_n x + C_n x^2$ (where "n" denotes that x is in the "n"th of N segments of its range), the multiplier outputs a 28-bit value, and a pipeline stage includes three ROMs (each having depth 256 bits): a first ROM having 26-bit width storing $A_i$ coefficients; a second ROM having 19-bit width storing $B_i$ coefficients, and a third ROM having 13-bit width storing $C_i$ coefficients. Preferably, each ROM stores two sets of Taylor's series coefficients: a first set comprising coefficients for each of 128 different segments of the range of "x" for computing the reciprocal of the input value, and a second set for computing the reciprocal of the input value's square root. Preferably, the set for computing the reciprocal of the input value's square root comprises two subsets: a first subset for each of 64 different segments of the range of "x" (for input words having even exponents); and a second subset for each of 64 different segments of the range of "x" (for input words having odd exponents). Preferably, the circuit generates an output value in response to a control word as well as the input value having IEEE floating point format, the output value is a Taylor's series approximation of the reciprocal of the input value when the control word has a first value, and the output value is a Taylor's series approximation of the reciprocal of the input value's square root when the control word has a second value.

What follows is computer source code, in the language C, which:

simulates the FIG. 2 embodiment of the inventive circuit. In the source code, the input value mantissa ("x_mant" in FIG. 2) is denoted as "x" (or "in_mant"), the input value exponent ("x_exp" in FIG. 2) is denoted as "in_exp", and the control word ("Control" in FIG. 2) is a single bit denoted as "mode." If the mode bit has a first value (mode=0), the program simulates generation of the reciprocal of the input. If the mode bit has the complementary value (mode=1), the program simulates generation of the reciprocal of the square root of the input. The simulation code assumes that the Taylor's series coefficients have been predetermined and performs special case handling (including by checking for a zero or infinite value of the exponent or mantissa of the input);

determines a set of Taylor's series coefficients for approximating the reciprocal of an input value (the input value is denoted as "g" in the relevant portion of the source code). The code generates three coefficients ($A_n$, $B_n$, and $C_n$) for each segment of the input value range, assuming a predetermined number of segments ($2^{RCPLU}$) of the input value range; and determines a set of Taylor's series coefficients for approximating the reciprocal of the square root of an input value. The code generates three coefficients ($A_n$, $B_n$, and $C_n$) for each segment of the input value range, assuming a predetermined number of segments ($2^{RSQLU}$) of the input value range, and taking into account whether the input value has even or odd exponent.

The following parameters are employed in the source code:

EW: the width (number of bits) of the exponent of each input word;

MW: the width (number of bits) of the mantissa of each input word;

RSQLU: $2^{RSQLU}$ is the number of segments of the input value range for which coefficients are predetermined for use in generating the reciprocal of the square root of the input;

RCPLU: $2^{RCPLU}$ is the number of segments of the input value range for which coefficients are predetermined for use in generating the reciprocal of the input;

ABITS: the width (number of bits) of each of the $A_n$ coefficients; and

TRUNCK2: the number of bits effectively truncated by the multiplier that generates the square of the input (if the word length of the multiplier's output is L, and the input is a 23-bit mantissa of a floating point word, then TRUNCK2 satisfies TRUNCK2=46−L).

The following values of the last four of these parameters, identified by the optimization method (described below) assuming that EW=10 and MW=23, are typically employed in the source code: RSQLU=6; RCPLU=7; ABITS=26; and TRUNCK2=18.

The portion of the code identified by the comment "first do reciprocal square root table" determines Taylor's series coefficients for use in generating the reciprocal of the square root of the input, including by computing an "exact" mantissa of the reciprocal of the square root of the input (using the Matlab function "1.0/sqrt(g)") and comparing it with at least one trial value ("guess mantissa") generated using a trial set of coefficients, for an input value "g" in each segment of the input value range. The following portion of the code (identified by the comment "now do reciprocal table") determines Taylor's series coefficients for use in generating the reciprocal of the input, including by computing an "exact" mantissa of the reciprocal of the input (using the Matlab function "1.0/g") and comparing it with at least one trial value ("guess mantissa") generated using a trial set of coefficients, for an input value "g" in each segment of the input value range.

The remaining portion of the code (beginning at the comment "write the table functions") simulates the FIG. 2 embodiment of the inventive circuit, using a previously determined set of coefficients for generating the reciprocal of the square root of the input and another predetermined set of coefficients for generating the reciprocal of the input. The portion of this code following the comment "check for special cases" simulates the operation of logic unit 56, including by identifying whether the input value is not a valid number (setting "out_NaN" equal to 1 when the input value is not a valid number), whether the input value is zero, and whether the input value is infinite.

The source code is as follows:

```
/* PLI code */ define PLI_RETURN(value) { tf_putp(0, value) ; return; } int brsq_checkargs( );
int brsq( );

/* module defines */
```

```c
#include "brsq.mch"

/* module defines */ define EW      10 define MW      23 define RSQLU   6 define RCPLU   7 define ABITS   26 define TRUNCK2 18 define ID      500 define OD      1000 include <stdio.h>
include <math.h>
include <time.h> include "brsq.h"

main(int argc, char * *argv)
{
  double g;
  double d0, d1, d2;
  long long d0l, d1l, d2l;
  long long gm;
  int d0m, d1m, d2m;
  int e0m, e1m, e2m;
  int odd_exp;
  int rsq_a[1 << RCPLU], rsq_b[1 << RCPLU], rsq_c[1 << RCPLU];
  int rcp_a[1 << RCPLU], rcp_b[1 << RCPLU], rcp_c[1 << RCPLU];
  int maxb, maxc;
  int shift;
  static int rsq_err[1 << (MW+1)], rcp_err[1 << (MW+1)];
  int i, j, k;
  long long k2;
  int bbits, cbits;
  time_t seconds;
  struct tm *thetime;

// generate lookup tables
  // first do reciprocal square root table
```

```
    maxb = maxc = 0;
    for (odd_exp = 0; odd_exp < 2; odd_exp++) {
      for (i = 0; i < (1 << RSQLU); i++) {
        g = (double) (1 << odd_exp) * (1 + ((double) i / (double) (1 << (RSQLU))) +
(1.0 / (double) (1 << (RSQLU+1))));
        d0 = 1.0/sqrt(g - 1.0 / (double) (1 << (RSQLU+1-odd_exp)));
        d1 = 1.0/sqrt(g);
        d2 = 1.0/sqrt(g + 1.0 / (double) (1 << (RSQLU+1-odd_exp)));
#ifdef DEBUG
        fprintf(stderr, "d* = %.8f, %.8f, %.8f\n", d0, d1, d2);
#endif
        d0l = *(long long *) &d0;
        d1l = *(long long *) &d1;
        d2l = *(long long *) &d2;
        d0m = ((d0l & ((((long long) 1) << 52) - 1)) >> (52 - (ABITS-1))) + (1 <<
(ABITS-1));
        d1m = ((d1l & ((((long long) 1) << 52) - 1)) >> (52 - (ABITS-1))) + (1 <<
(ABITS-1));
        d2m = ((d2l & ((((long long) 1) << 52) - 1)) >> (52 - (ABITS-1))) + (1 <<
(ABITS-1));
#ifdef DEBUG
        fprintf(stderr, "d*m (pre-shift) = %x, %x, %x\n", d0m, d1m, d2m);
#endif
        // get exponents
        e0m = (d0l >> 52) & 0x7ff;
        e1m = (d1l >> 52) & 0x7ff;
        e2m = (d2l >> 52) & 0x7ff;
#ifdef DEBUG
        fprintf(stderr, "e*m = %d, %d, %d\n", e0m, e1m, e2m);
#endif
        // may need to shift coefficients if exponents are not the same
        // shift relative to the value which will be a
        d0m <<= (e0m - e1m);
        d2m >>= (e1m - e2m);
#ifdef DEBUG
        fprintf(stderr, "d*m (post-shift) = %x, %x, %x\n", d0m, d1m, d2m);
#endif
        rsq_a[(odd_exp << RSQLU) + i] = d1m;
        rsq_b[(odd_exp << RSQLU) + i] = d0m - d2m;
        rsq_c[(odd_exp << RSQLU) + i] = 2*d0m - 4*d1m + 2*d2m;
        if (rsq_b[(odd_exp << RSQLU) + i] > maxb) maxb = rsq_b[(odd_exp <<
RSQLU) + i];
        if (rsq_c[(odd_exp << RSQLU) + i] > maxc) maxc = rsq_c[(odd_exp <<
RSQLU) + i];
        if (rsq_a[(odd_exp << RSQLU) + i] < 0 || rsq_a[(odd_exp << RSQLU) + i] > (1
<< ABITS)) {
```

```
        fprintf(stderr, "a out of range! %x (i = %d, d*m = %d, %d, %d)\n",
rsq_a[(odd_exp << RSQLU) + i], i, d0m, d1m, d2m);
        exit(1);
    }
#ifdef DEBUG
    fprintf(stderr, "i = %d; a = %x, b = %x, c = %x\n", i, rsq_a[(odd_exp <<
RSQLU) + i], rsq_b[(odd_exp << RSQLU) + i], rsq_c[(odd_exp << RSQLU) + i]);
#endif
    // check accuracy
    for (j = 0, g = (double) (1 << odd_exp) * (1 + ((double) i / (double) (1 <<
(RSQLU)))); j < (1 << MW-RSQLU); j++, g += (double) (1 << odd_exp) /
(double) (1 << (MW))) {
        // compute exact mantissa
        d1 = 1.0/sqrt(g);
        d1l = *(long long *) &d1;
        d1m = ((d1l & ((((long long) 1) << 52) - 1)) >> (52 - MW)) + (1 << MW);
        // fudge for 1.0 input
        if (g == 1.0) d1m <<= 1;
        // compute guess mantissa
        k = j - (1 << (MW-RSQLU-1));
        k2 = (long long) k * k;
        k2 >>= TRUNCK2;
        gm = ((long long) rsq_a[(odd_exp << RSQLU) + i] << (2 * (MW-
RSQLU))) - (((long long) rsq_b[(odd_exp << RSQLU) + i] * k) << (MW-
RSQLU)) + (((long long) rsq_c[(odd_exp << RSQLU) + i] * k2) << TRUNCK2);
#ifdef DEBUG
        fprintf(stderr, "k = %x, k2 = %llx: terms = %llx, %llx, %llx, sum =
%llx\n",
            k, k2,
            (long long) rsq_a[(odd_exp << RSQLU) + i] << (2 * (MW-
RSQLU)),
            ((long long) rsq_b[(odd_exp << RSQLU) + i] * k) << (MW-
RSQLU),
            ((long long) rsq_c[(odd_exp << RSQLU) + i] * k2) << TRUNCK2,
            gm);
#endif
        // right shift back again
        shift = 2 * (MW-RSQLU) + (ABITS-(MW+1));
        gm >>= shift;
        rsq_err[(((odd_exp << RSQLU) + i) << (MW-RSQLU)) + j] = d1m - gm;
#ifdef DEBUG
        fprintf(stderr, "d1 = %.8f, d1m = %x, gm = %llx, err = %d\n", d1, d1m, gm,
rsq_err[(((odd_exp << RSQLU) + i) << (MW-RSQLU)) + j]);
#endif
        if (rsq_err[(((odd_exp << RSQLU) + i) << (MW-RSQLU)) + j] > 1 ||
rsq_err[(((odd_exp << RSQLU) + i) << (MW-RSQLU)) + j] < -1) {
```

```
        fprintf(stderr, "abs err > 1!! i = %d, j = %d, err = %d\n", i, j,
rsq_err[(((odd_exp << RSQLU) + i) << (MW-RSQLU)) + j]);
        exit(1);
      }
    }
  }
}
#ifdef DEBUG
  fprintf(stderr, "rsq: maxb = %x, maxc = %x\n", maxb, maxc);
#endif
  // now do reciprocal table
  // don't reset maxb, maxc as we want the larger value
  // maxb = maxc = 0;
  for (i = 0; i < (1 << RCPLU); i++) {
    g = 1 + ((double) i / (double) (1 << (RCPLU))) + (1.0 / (double) (1 << (RCPLU+1)));
    d0 = 1.0/(g - 1.0 / (double) (1 << (RCPLU+1)));
    d1 = 1.0/(g);
    d2 = 1.0/(g + 1.0 / (double) (1 << (RCPLU+1)));
#ifdef DEBUG
    fprintf(stderr, "d* = %.8f, %.8f, %.8f\n", d0, d1, d2);
#endif
    d0l = *(long long *) &d0;
    d1l = *(long long *) &d1;
    d2l = *(long long *) &d2;
    d0m = ((d0l & ((((long long) 1) << 52) - 1)) >> (52 - (ABITS-1))) + (1 << (ABITS-1));
    d1m = ((d1l & ((((long long) 1) << 52) - 1)) >> (52 - (ABITS-1))) + (1 << (ABITS-1));
    d2m = ((d2l & ((((long long) 1) << 52) - 1)) >> (52 - (ABITS-1))) + (1 << (ABITS-1));
#ifdef DEBUG
    fprintf(stderr, "d*m (pre-shift) = %x, %x, %x\n", d0m, d1m, d2m);
#endif
    // get exponents
    e0m = (d0l >> 52) & 0x7ff;
    e1m = (d1l >> 52) & 0x7ff;
    e2m = (d2l >> 52) & 0x7ff;
#ifdef DEBUG
    fprintf(stderr, "e*m = %d, %d, %d\n", e0m, e1m, e2m);
#endif
    // may need to shift coefficients if exponents are not the same
    // shift relative to the value which will be a
    d0m <<= (e0m - e1m);
    d2m >>= (e1m - e2m);
#ifdef DEBUG
```

```
        fprintf(stderr, "d*m (post-shift) = %x, %x, %x\n", d0m, d1m, d2m);
#endif
    rcp_a[i] = d1m;
    rcp_b[i] = d0m - d2m;
    rcp_c[i] = 2*d0m - 4*d1m + 2*d2m;
    if (rcp_b[i] > maxb) maxb = rcp_b[i];
    if (rcp_c[i] > maxc) maxc = rcp_c[i];
    if (rcp_a[i] < 0 || rcp_a[i] > (1 << ABITS)) {
        fprintf(stderr, "a out of range! %x (i = %d, d*m = %d, %d, %d)\n", rcp_a[i], i,
d0m, d1m, d2m);
        exit(1);
    }
#ifdef DEBUG
    fprintf(stderr, "i = %d; a = %x, b = %x, c = %x\n", i, rcp_a[i], rcp_b[i],
rcp_c[i]);
#endif
    // check accuracy
    for (j = 0, g = 1 + ((double) i / (double) (1 << (RCPLU))); j < (1 << MW-
RCPLU); j++, g += 1.0 / (double) (1 << (MW))) {
        // compute exact mantissa
        d1 = 1.0/(g);
        d11 = *(long long *) &d1;
        d1m = ((d11 & ((((long long) 1) << 52) - 1)) >> (52 - MW)) + (1 << MW);
        // fudge for 1.0 input
        if (g == 1.0) d1m <<= 1;
        // compute guess mantissa
        k = j - (1 << (MW-RCPLU-1));
        k2 = (long long) k * k;
        k2 >>= TRUNCK2;
        gm = ((long long) rcp_a[i] << (2 * (MW-RCPLU))) - (((long long) rcp_b[i] *
k) << (MW-RCPLU)) + (((long long) rcp_c[i] * k2) << TRUNCK2);
#ifdef DEBUG
        fprintf(stderr, "k = %x, k2 = %llx: terms = %llx, %llx, %llx, sum = %llx\n",
            k, k2,
            (long long) rcp_a[i] << (2 * (MW-RCPLU)),
            ((long long) rcp_b[i] * k) << (MW-RCPLU),
            ((long long) rcp_c[i] * k2) << TRUNCK2,
            gm);
#endif
        // right shift back again
        shift = 2 * (MW-RCPLU) + (ABITS-(MW+1));
        gm >>= shift - 1;
        gm++;
        gm >>= 1;
        rcp_err[(i << (MW-RCPLU)) + j] = d1m - gm;
#ifdef DEBUG
```

```
        fprintf(stderr, "d1 = %.8f, d1m = %x, gm = %llx, err = %d\n", d1, d1m, gm,
rcp_err[(i << (MW-RCPLU)) + j]);
#endif
        if (rcp_err[(i << (MW-RCPLU)) + j] > 1 || rcp_err[(i << (MW-RCPLU)) + j] <
-1) {
            fprintf(stderr, "abs err > 1!! i = %d, j = %d, err = %d\n", i, j, rcp_err[(i <<
(MW-RCPLU)) + j]);
            exit(1);
        }
      }
    }
  }
#ifdef DEBUG
  fprintf(stderr, "rcp: maxb = %x, maxc = %x\n", maxb, maxc);
#endif
  // write the output
  // make a pretty header
  seconds = time((time_t *) NULL);
  thetime = localtime(&seconds);
  printf("// Automatically generated by %s for %s\n// on %s\
\n", argv[0], cuserid((char *) NULL), ctime(&seconds), thetime->tm_year+1900);
  // write the table functions
  printf("function f_a( a\n\t     , lookup\n\t     );\n\n");
  printf("  input [%d]\tlookup;\n  output [%d]\ta;\n\n  a = (~lookup) ? ", RSQLU+2,
ABITS);
  for (odd_exp = 0; odd_exp < 2; odd_exp++) {
    for (i = 0; i < (1 << RSQLU); i++) {
      if (odd_exp != 0 || i != 0) printf("\t\t: ");
      printf("%d'h%*.*x\n", ABITS, (ABITS+3)/4, (ABITS+3)/4, rsq_a[(odd_exp
<< RSQLU) + i]);
    }
  }
  for (i = 0; i < (1 << RCPLU); i++) {
    printf("\t\t: %d'h%*.*x\n", ABITS, (ABITS+3)/4, (ABITS+3)/4, rcp_a[i]);
  }
  printf("\t\t;\n\nendfunction // f_a\n\n");
  for (bbits = 0; (1 << bbits) <= maxb; bbits++) ;
  printf("function f_b( b\n\t     , lookup\n\t     );\n\n");
  printf("  input [%d]\tlookup;\n  output [%d]\tb;\n\n  b = (~lookup) ? ", RSQLU+2,
bbits);
  for (odd_exp = 0; odd_exp < 2; odd_exp++) {
    for (i = 0; i < (1 << RSQLU); i++) {
      if (odd_exp != 0 || i != 0) printf("\t\t: ");
      printf("%d'h%*.*x\n", bbits, (bbits+3)/4, (bbits+3)/4, rsq_b[(odd_exp <<
RSQLU) + i]);
    }
```

```
    }
    for (i = 0; i < (1 << RCPLU); i++) {
      printf("\t\t: %d'h%*.*x\n", bbits, (bbits+3)/4, (bbits+3)/4, rcp_b[i]);
    }
    printf("\t\t;\n\nendfunction // f_b\n\n");
    for (cbits = 0; (1 << cbits) <= maxc; cbits++) ;
    printf("function f_c( c\n\t    , lookup\n\t    );\n\n");
    printf("  input [%d]\tlookup;\n  output [%d]\tc;\n\n  c = (~lookup) ? ", RSQLU+2, cbits);
    for (odd_exp = 0; odd_exp < 2; odd_exp++) {
      for (i = 0; i < (1 << RSQLU); i++) {
        if (odd_exp != 0 || i != 0) printf("\t\t: ");
        printf("%d'h%*.*x\n", cbits, (cbits+3)/4, (cbits+3)/4, rsq_c[(odd_exp << RSQLU) + i]);
      }
    }
    for (i = 0; i < (1 << RCPLU); i++) {
      printf("\t\t: %d'h%*.*x\n", cbits, (cbits+3)/4, (cbits+3)/4, rcp_c[i]);
    }
    printf("\t\t;\n\nendfunction // f_c\n\n");
    // now the actual code to do the computation
    printf("function f_rsq(ADDER_TYPE\n\
\t    , in\n\
\t    , mode\n\
\t    , odd_exp\n\
\t    , out\n\
\t    );\n\n\
  string\t\tADDER_TYPE;\n\n\
  directive(fatype=ADDER_TYPE);\n\n\
  input [%d]\t\tin;\n\
  input [1]\t\tmode;          // 1 for recip, 0 for rsq\n\
  input [1]\t\todd_exp;\n\n\
  // stage 1\n\
  // get lookup values and compute x^2 term\n\
  directive(group=\"lookup\");\n\
  wire [%d]\t\tlu = (mode) ? cat(mode, in[%d:%d]) : cat(mode, odd_exp, in[%d:%d]);\n\
  buffer(lu, 5);\n\n",
        MW, RSQLU+2, MW-1, MW-RCPLU, MW-1, MW-RSQLU);
    printf("  wire [%d]\t\ta = f_a(lu);\n\
  wire [%d]\t\tb = f_b(lu);\n\
  wire [%d]\t\tc = f_c(lu);\n\n\
  directive(group=\"x2\");\n\
  wire signed [%d]\tx = cat((signed [0:0]) (mode) ? ~in[%d] : ~in[%d], mode ^ in[%d], in[%d:0]);\n\
  wire [%d]\t\tx2 = x * x;\n\n",
```

```
            ABITS, bbits, cbits, MW-RSQLU, MW-RCPLU-1, MW-RCPLU, MW-
RCPLU-1, MW-RCPLU-2, 2*(MW-RSQLU));
  printf("  directive(group=\"stage1\");\n\
 wire [%d]\t\ta_q = sreg((mode) ? cat(1'b0, a) : cat(a, 1'b0));\n\
 wire [%d]\t\tb_q = sreg(b);\n\
 wire [%d]\t\tc_q = sreg(c);\n\
 wire [%d]\t\tx2t = sreg((mode) ? x2[%d:%d] : x2[%d:%d]);\n\
 wire signed [%d]\tx_q = sreg(x);\n\
 wire [1]\t\tmode_q = sreg(mode);\n\n",
        ABITS+1, bbits, cbits, 2*(MW-RSQLU)-TRUNCK2, 2*(MW-RSQLU)-3,
TRUNCK2-2,
        2*(MW-RSQLU)-2, TRUNCK2-1, MW-RSQLU);
 if (TRUNCK2 <= MW-RSQLU) {
  printf(" // stage 2\n\
// do the multiplies and sum to carrysave format\n\
 directive(group=\"cs\");\n\
 directive(carrysave=\"convert\");\n\
 wire [%d]\t\ta_sh = cat(a_q repl(i, %d) { , 1'b0 });\n\
 wire signed [%d]\tbx = x_q * b_q;\n\
 wire [%d]\t\tcx2t = x2t * c_q;\n\
 wire [%d]\t\tround = cat(mode_q repl(i, %d) { , 1'b0 });\n\
 wire [%d]\t\tgm = a_sh - (bx << %d) + cx2t + round;\n\n",
        ABITS+1+2*(MW-RSQLU)-TRUNCK2, 2*(MW-RSQLU)-TRUNCK2,
        bbits+(MW-RSQLU), cbits+2*(MW-RSQLU)-TRUNCK2,
        ABITS+1+2*(MW-RSQLU)-TRUNCK2-MW-2, ABITS+1+2*(MW-
RSQLU)-TRUNCK2-MW-3,
        ABITS+1+2*(MW-RSQLU)-TRUNCK2, (MW-RSQLU)-
TRUNCK2+1);
  printf("  directive(group=\"stage2\");\n\
 wire [%d]\t\tgm_q = sreg(gm);\n\
 wire [1]\t\tmode_2q = sreg(mode_q);\n\n\
// stage 3\n\
// do the final sum\n\
 directive(group=\"sum\");\n\
 directive(carrysave=\"off\");\n\
 wire [%d]\t\tsum = gm_q;\n\
 output [%d]\t\tout = (mode_2q) ? sum[%d:%d] : sum[%d:%d];\n\n\
endfunction // f_rsq\n\n",
        ABITS+1+2*(MW-RSQLU)-TRUNCK2, ABITS+1+2*(MW-RSQLU)-
TRUNCK2, MW,
        ABITS+1+2*(MW-RSQLU)-TRUNCK2-3, ABITS+1+2*(MW-
RSQLU)-TRUNCK2-2-MW,
        ABITS+1+2*(MW-RSQLU)-TRUNCK2-2, ABITS+1+2*(MW-
RSQLU)-TRUNCK2-1-MW);
 }
 else {
```

```
        printf(" // stage 2\n\
// do the multiplies and sum to carrysave format\n\
directive(group=\"cs\");\n\
directive(carrysave=\"convert\");\n\
wire [%d]\t\ta_sh = cat(a_q repl(i, %d) { , 1'b0 });\n\
wire signed [%d]\tbx = x_q * b_q;\n\
wire [%d]\t\tcx2t = x2t * c_q;\n\
wire [%d]\t\tround = cat(mode_q repl(i, %d) { , 1'b0 });\n",
        ABITS+(MW-RSQLU), MW-RSQLU-1,
        bbits+(MW-RSQLU), cbits+2*(MW-RSQLU)-TRUNCK2,
        ABITS+(MW-RSQLU)-MW-2, ABITS+(MW-RSQLU)-MW-3);
    if (TRUNCK2 == (MW-RSQLU)+1)
        printf(" wire [%d]\t\tgm = a_sh - bx + cx2t + round;\n\n", ABITS+(MW-RSQLU));
    else
        printf(" wire [%d]\t\tgm = a_sh - bx + (cx2t << %d) + round;\n\n",
ABITS+(MW-RSQLU), TRUNCK2-(MW-RSQLU)-1);
    printf(" directive(group=\"stage2\");\n\
wire [%d]\t\tgm_q = sreg(gm);\n\
wire [1]\t\tmode_2q = sreg(mode_q);\n\n\
// stage 3\n\
// do the final sum\n\
directive(group=\"sum\");\n\
directive(carrysave=\"off\");\n\
wire [%d]\t\tsum = gm_q;\n\
output [%d]\t\tout = (mode_2q) ? sum[%d:%d] : sum[%d:%d];\n\n\
endfunction // f_rsq\n\n",
        ABITS+(MW-RSQLU), ABITS+(MW-RSQLU), MW,
        ABITS+(MW-RSQLU)-3, ABITS+(MW-RSQLU)-2-MW,
        ABITS+(MW-RSQLU)-2, ABITS+(MW-RSQLU)-1-MW);
}
// exponent inversion function
    printf("function f_invexp( mode
\t\t , in_sign
\t\t , in_exp
\t\t , in_mant
\t\t , out_sign
\t\t , out_exp
\t\t , out_mant_zero
\t\t , out_NaN
\t\t );\n
  input [1]\t\tmode;
  input [1]\t\tin_sign;
  input [%d]\t\tin_exp;
  input [%d]\t\tin_mant;\n
  directive(fatype=\"ripple\");\n
```

```
// first stage
directive(group=\"estage1\");
wire [1]\t\tmant_zero = ~(| in_mant) & (mode | in_exp[0]);\n
// first stage registers
wire [1]\t\tin_sign_q = sreg(in_sign);
wire [1]\t\tmant_zero_q = sreg(mant_zero);
wire [%d]\t\tin_exp_q = sreg(in_exp);
wire [1]\t\tmode_q = sreg(mode);\n
// second stage
directive(group=\"estage2\");\n
// check for special cases ...
wire [1]\t\texp_zero = ~(| in_exp_q);
wire [1]\t\texp_infinite = & in_exp_q;
wire [1]\t\texp_max = mode_q & ((in_exp_q == cat(repl(i, %d, \",\") { 1'b1 },
1'b0)) |
\t\t\t\t (in_exp_q == cat(repl(i, %d, \",\") { 1'b1 }, 1'b0, 1'b1) &
~mant_zero_q));\n
wire [1]\t\tin_NaN = exp_infinite & ~mant_zero_q;
wire [1]\t\tin_infinite = exp_infinite & mant_zero_q;\n
wire [1]\t\texp_is_special = exp_zero | exp_infinite | exp_max | in_sign_q &
~mode_q;
wire [1]\t\tspecial_exp_bit = (in_NaN | exp_zero | in_sign_q & ~mode_q) ? 1'b1 :
1'b0;\n
// compute the unbiased exponent
wire signed [%d]\tunb_exp = cat((signed [0:0]) 1'b0, in_exp_q) - %d;\n
// second stage registers
output [1]\t\tout_sign = sreg(in_sign_q & ~exp_max & ~in_infinite & mode_q &
~exp_zero);
output [1]\t\tout_NaN = sreg(in_NaN | in_sign_q & ~exp_zero & ~mode_q);
output [1]\t\tout_mant_zero = sreg(exp_zero | exp_infinite | exp_max |
mant_zero_q & mode_q);
wire [1]\t\texp_is_special_q = sreg(exp_is_special);
wire [1]\t\tspecial_exp_bit_q = sreg(special_exp_bit);
wire signed [%d]\tunb_exp_q = sreg(unb_exp);
wire [1]\t\tmode_2q = sreg(mode_q);
wire [1]\t\tmant_zero_2q = sreg(mant_zero_q);\n
// third stage
directive(group=\"estage3\");
// compute \"normal\" output exponent
wire signed [%d]\tinv_exp = %d - ((mode_2q) ? unb_exp_q : (unb_exp_q >> 1)) -
1 + mant_zero_2q;\n
// output result
output [%d]\t\tout_exp = (exp_is_special_q) ? cat(repl(i, %d, \",\") {
special_exp_bit_q }) : inv_exp[%d:0];\n
endfunction // f_invexp\n\n",
        EW, MW, EW, EW-1, EW-2, EW+1, (1 << (EW-1))-1, EW+1,
```

```
    EW+1, (1 << (EW-1))-1, EW, EW, EW-1);
// module code
 printf("module brsq(MOD_NAME,\n\
\t   STALL_NAME,\n\
\t   CLOCK_NAME,\n\
\t   ADDER_TYPE,\n\
\t   ID, IL,\n\
\t   OD, OL,\n\
\t   in,\n\
\t   mode,\n\
\t   out\n\
\t   );\n\n\
  string\t\tMOD_NAME = \"rsq\";\n\
  string\t\tSTALL_NAME = \"\";\n\
  string\t\tCLOCK_NAME = \"clk\";\n\
  string\t\tADDER_TYPE = \"cla\";\n\
  integer\t\tID = 500,\n\
\t\t\tIL = 500,\n\
\t\t\tOD = 1000,\n\
\t\t\tOL = 500;\n\n\
  directive(modname=MOD_NAME);\n\
  if (STALL_NAME != \"\") { directive(pipestall=STALL_NAME) };\n\
  directive (clock=CLOCK_NAME);\n\
  directive(indelay=ID);\n\
  directive(inload=IL);\n\
  directive(outdelay=OD);\n\
  directive(outload=OL);\n\n\
  input [%d]\t\tin;\n\
  input [1]\t\tmode;\n\n\
  // invert mantissa\n\
  wire [%d]\t\tin_mant = in[%d:0];\n\
  wire [%d]\t\tout_mant;\n\n\
  wire [1]\t\todd_cxp = ~in[%d];\n\n\
  f_rsq( ADDER_TYPE\n\
\t, in_mant\n\
\t, mode\n\
\t, odd_exp\n\
\t, out_mant\n\
\t);\n\n",
            MW+EW+1, MW, MW-1, MW, MW);
  printf(" // invert exponent and generate sign\n\
  wire [1]\t\tin_sign = in[%d];\n\
  wire [%d]\t\tin_exp = in[%d:%d];\n\
  wire [%d]\t\tout_exp;\n\
  wire [1]\t\tout_mant_zero;\n\
  wire [1]\t\tout_NaN;\n\
```

```
    wire [1]\t\tout_sign;\n\n\
    f_invexp( mode\n\
\t  , in_sign\n\
\t  , in_exp\n\
\t  , in_mant\n\
\t  , out_sign\n\
\t  , out_exp\n\
\t  , out_mant_zero\n\
\t  , out_NaN\n\
\t  );\n\n\
  directive(group=\"output\");\n\
  // clear the mantissa if out_mant_zero is 1\n\
  // or out_NaN into the lsb of the mantissa so that NaN's always\n\
  // have a non-zero mantissa\n\
  output [%d]\t\tout = cat(out_sign, out_exp, out_mant & cat(repl(i, %d, \",\") {
~out_mant_zero }) | out_NaN);\n\n\
endmodule // brsq\n",
        EW+MW, EW, EW+MW-1, MW, EW, 1+EW+MW, MW);
  return 0;
}
```

Another aspect of the invention is a method for determining optimal (or preferred) parameters for elements of a pipelined circuit (or pipelined processor) having at least one pipeline stage including ROMs pre-loaded with Taylor's series coefficients, where the optimization minimizes the circuit's size (footprint) with the constraints that the input values have specified format and the output has no more than acceptable error. The method assumes a specific function (e.g., reciprocal, reciprocal square root, sine, cosine, or some other function) to be approximated using the coefficients and a specific degree for the Taylor's approximation (e.g., a degree of two for a quadratic approximation). For example, the method can assume that a quadratic approximation of form $A_n - B_n x + C_n x^2$ is to be generated for each input value x in the "n"th segment of the input value range, and determine coefficients $A_n$, $B_n$, and $C_n$ for each segment that minimize the circuit's size subject to given constraints on input value format and output value error. For a circuit having a multiplier for computing a truncated version of the square of the input value as well as ROMs for storing Taylor's series coefficients, the method can determine an optimal (or preferred) combination of the width of each coefficient value (and thus the width of each ROM), the number of segments of the input value range for each term of the Taylor's approximation (and thus the depth of each ROM), and the width of the multiplier's output value (i.e., the number of bits truncated by the multiplier). For a circuit operable to generate an approximation (whose mantissa has form $A_n - B_n x + C_n x^2$) of either the reciprocal or reciprocal square root of an input word having IEEE floating point format with 23-bit mantissa, where the circuit has a first ROM for $A_i$ coefficients, a second ROM for $B_i$ coefficients, and a third ROM for $C_i$ coefficients, the method determines a preferred parameter set specifying that each ROM has 256 bit depth (for storing coefficients for 128 different input value ranges for computing the reciprocal of the input value, for 64 different input value ranges for computing the reciprocal square root of each input value having even exponent, and for 64 different input value ranges for computing the reciprocal square root of each input value having odd exponent), the first ROM has 26-bit width, the second ROM has 19-bit width, the third ROM has 13-bit width, and the multiplier outputs a 28-bit value (18 bits are effectively truncated). For a similar circuit, where each input word has IEEE floating point format with 16-bit mantissa, the circuit includes an error ROM, and the circuit has a first ROM for $A_i$ coefficients, a second ROM for $B_i$ coefficients, and a third ROM for $C_i$ coefficients, the method determines a preferred parameter set specifying that each ROM has 512 bit depth (for storing coefficients for 256 different input value ranges for computing the reciprocal of the input value, for 128 different input value ranges for computing the reciprocal square root of each input value having even exponent, and for 128 different input value ranges for computing the reciprocal square root of each input value having odd exponent), the first ROM has 24-bit width, the second ROM has 16-bit width, the third ROM has 8-bit width, and the multiplier outputs an 8-bit value (the multiplier receives only the eight most significant bits of the input value and 8 bits of the output are effectively truncated).

Preferably, the parameter-determining method minimizes the width of an multiplier's output value indicative of $x^n$, where x is the input value (i.e., the method maximizes the number of bits truncated by the multiplier) even at the expense of widening the ROMs for storing the Taylor's series coefficients (i.e., even at the expense of using wider coefficients). Preferably, the method searches the parameter space (including the number of bits of each coefficient and the number of input value range segments), which maps to circuit area, for the set of parameters that (1) can be implemented with the smallest estimated circuit area; and (2) causes all results generated by the pipelined circuit to be within 1 LSB accuracy of the ideal result (or some other accuracy measure). The search of the parameter space is optionally done first on a coarse resolution (i.e., not checking every possible parameter value) and then on a fine resolution using the best range found by the coarse search.

Another aspect of the invention is a system for pipelined processing of graphics data, including any embodiment of the inventive circuit for generating an output word in response to an input word indicative of an input value, the output word being indicative of a Taylor's series approximation of the reciprocal (or the reciprocal of the square root) of the input value. For example, the system can include vertex processor (including a triangle setup module), a rasterizer, and a pixel shader. The inventive circuit can be implemented in one or more of the components of the system (e.g., in both the triangle setup module and the pixel shader).

Other embodiments are methods for pipelined processing of graphics data to generate an output word in response to an input word of the data, wherein the input word is indicative of an input value and such that the output word is indicative of a Taylor's series approximation of at least one of the input value's reciprocal and the reciprocal of the square root of the input value, said method including the steps of:

(a) generating a first set of values in response to the input word during a first interval, the values in the first set including a Taylor's series coefficient for each term of a Taylor's series approximation of one of the output word and a mantissa of the output word; and (b) after step (a), during a subsequent interval, generating the approximation of said one of the output word and the mantissa of the output word by performing at least one of addition, multiplication, and subtraction on a second set of values, wherein the values in the second set include at least one of the values in the first set and at least one intermediate value generated after step (a) and before step (b) in response to values including at least one other one of the values in the first set.

In some embodiments, the input word has a first mantissa and a first exponent, the output word has a second mantissa and a second exponent, the values in the first set include a coefficient value for each term of a Taylor's series approximation of the second mantissa, step (b) includes the step of generating the Taylor's series approximation of the second mantissa, and the method also includes the step of generating the second exponent in response to the first exponent.

In some embodiments, the first mantissa is in one of multiple segments of a range, and step (a) includes the step of generating the coefficient value for said each term of the approximation of the second mantissa in response to data indicating which of the segments includes the first mantissa, or the step of reading the coefficient value for said each term of the approximation of the second mantissa from at least one memory in response to data indicating which of the segments includes the first mantissa.

In some embodiments, the output word is generated in response to the input word and a control word, the output word is indicative of a Taylor's series approximation of the input value's reciprocal when the control word has a first value, and the output word is indicative of a Taylor's series approximation of the reciprocal of the input value's square root when the control word has a second value, and step (a)

includes the step of generating the first set of values in response to the input word and the control word.

The invention can be applied to other functions, such as: log, ln, sin, cos, tan, csc, sec, cot, sinh, cosh, tanh, csch, sech, coth, arcsin, arccos, arctan, arccsc, arcsec, srccot, arcsinh, arccosh, arctanh, arccsch, srccoth, and other functions known in the art.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

What is claimed is:

1. A pipelined circuit for pipelined processing of graphics data for generating an output word in response to an input word indicative of an input value and a control word, where the output word is indicative of a Taylor's series approximation of a reciprocal of the input value or a reciprocal of a square root of the input value depending on the control word, said circuit including:
    a first pipeline stage configured to respond to the input word and the control word by asserting a first set of values, the values in the first set including a Taylor's series coefficient for each term of a Taylor's series approximation of one of the output word and a mantissa of the output word, where the output word is indicative of a Taylor's series approximation of a reciprocal of the input value or a reciprocal of a square root of the input value depending on the control word; and
    at least one additional pipeline stage configured to generate the approximation of said one of the output word and the mantissa of the output word by performing at least one of addition, multiplication, and subtraction on a second set of values, wherein the values in the second set include at least one of the values in the first set and at least one intermediate value generated by the at least one additional pipeline stage in response to values including at least one other one of the values in the first set.

2. The circuit of claim 1, wherein the input word has a first mantissa and a first exponent, the output word has a second mantissa and a second exponent, the values in the first set include a coefficient value for each term of a Taylor's series approximation of the second mantissa, and the at least one additional pipeline stage is configured to generate said approximation of the second mantissa.

3. The circuit of claim 2, also including:
    circuitry coupled and configured to receive the first exponent and to generate the second exponent in response to the first exponent.

4. The circuit of claim 2, wherein the first mantissa is in one of multiple segments of a range, and the first pipeline stage includes circuitry configured to assert to the at least one additional pipeline stage a coefficient value for each term of the approximation of the second mantissa, wherein the circuitry is configured to generate each said coefficient value in response to data indicating which of the segments includes the first mantissa.

5. The circuit of claim 2, wherein the first mantissa is in one of multiple segments of a range, the first pipeline stage includes a set of ROMs pre loaded with coefficient values for each term of the approximation of the second mantissa, each of the ROMs stores a set of the coefficient values for one said term, and each said set of the coefficient values includes a coefficient value for each of the segments.

6. The circuit of claim 5, wherein the first mantissa is in one of N segments of the range, the approximation of the second mantissa has form $A_n - B_n x + C_n x^2$, where "x" is one of the first mantissa and a truncated version of the first mantissa and each of $A_n$, $B_n$, and $C_n$ is one of the coefficient values for an "n"th one of the segments, and the set of ROMs includes:
    a first ROM preloaded with N coefficients $A_i$, where "i" has a different value for each of the segments;
    a second ROM pre loaded with N coefficients $B_i$, where "i" has a different value for each of the segments; and
    a third ROM preloaded with N coefficients $C_i$, where "i" has a different value for each of the segments.

7. The circuit of claim 5, wherein the first mantissa is in one of N segments of the range, the approximation of the second mantissa has form $A_n - B_n x + C_n x^2 - E$, where "x" is one of the first mantissa and a truncated version of the first mantissa, each of $A_n$, $B_n$, and $C_n$ is one of the coefficient values for an "n"th one of the segments, E is an error value, and the set of ROMs includes:
    a first ROM preloaded with N coefficients $A_i$, where "i" has a different value for each of the segments;
    a second ROM preloaded with N coefficients $B_i$, where "i" has a different value for each of the segments;
    a third ROM preloaded with N coefficients $C_i$, where "i" has a different value for each of the segments; and
    a fourth ROM preloaded with error values, wherein the error values include the error value E.

8. The circuit of claim 2, wherein the approximation of the second mantissa has form $A_n - B_p x + C_q x^2$, where "x" is one of the first mantissa and a truncated version of the first mantissa, $A_n$ is a coefficient of a first coefficient set, $B_p$ is a coefficient of a second coefficient set, and $C_q$ is a coefficient of a third coefficient set, and $1 \leq n \leq N_1$, $1 \leq p \leq N_2$, and $1 \leq q \leq N_3$, and wherein the first pipeline stage includes:
    a first ROM preloaded with $N_1$ different ones of the coefficients $A_n$;
    a second ROM preloaded with $N_2$ different ones of the coefficients $B_p$; and
    a third ROM preloaded with $N_3$ different ones of the coefficients $C_q$.

9. The circuit of claim 8, wherein $128 \leq N_1 \leq 512$, $128 \leq N_2 \leq 512$, and $128 \leq N_3 512$.

10. The circuit of claim 8, wherein the input word has IEEE floating point format, the first mantissa is a 23-bit word, $N_1 = N_2 = N_3 = 256$, each of the coefficients $A_n$ is a 26-bit word, each of the coefficients $B_p$ is a 19-bit word, and each of the coefficients $C_q$ is a 13-bit word.

11. The circuit of claim 10, wherein the first pipeline stage also includes:
    a multiplier coupled to receive one of the first mantissa and a truncated version of the first mantissa, and configured to generate a 28-bit word indicative of a truncated version of $x^2$.

12. The circuit of claim 10, wherein the circuit is configured to generate the output word in response to the input word and a control word, the output word is indicative of the Taylor's series approximation of the reciprocal of the input value when the control word has a first value, and the output word is indicative of the Taylor's series approximation of the reciprocal of the square root of the input value when the control word has a second value.

13. The circuit of claim 12, wherein the coefficients $A_n$ include 128 different coefficients that are retrievable when the control word has the first value, and 128 different coefficients that are retrievable when the control word has the second value, the coefficients $B_p$ include 128 different coefficients that are retrievable when the control word has the first value, and 128 different coefficients that are retrievable when the control word has the second value, and the coefficients $C_q$ include 128 different coefficients that are retrievable when the control word has the first value, and 128 different coefficients that are retrievable when the control word has the second value.

14. The circuit of claim 12, wherein the coefficients $A_n$ include 128 different coefficients that are retrievable when the control word has the first value, 64 different coefficients that are retrievable when the control word has the second value and the first exponent is odd, and 64 different coefficients that are retrievable when the control word has the second value and the first exponent is even, the coefficients $B_p$ include 128 different coefficients that are retrievable when the control word has the first value, 64 different coefficients that are retrievable when the control word has the second value and the first exponent is odd, and 64 different coefficients that are retrievable when the control word has the second value and the first exponent is even, and the coefficients $C_q$ include 128 different coefficients that are retrievable when the control word has the first value, 64 different coefficients that are retrievable when the control word has the second value and the first exponent is odd, and 64 different coefficients that are retrievable when the control word has the second value and the first exponent is even.

15. The circuit of claim 1, wherein the circuit is configured to generate the output word in response to the input word and said control word, wherein the output word is indicative of the Taylor's series approximation of the reciprocal of the input value when the control word has a first value, and the output word is indicative of the Taylor's series approximation of the reciprocal of the square root of the input value when the control word has a second value.

16. A pipelined circuit as claimed in claim 1, wherein the input word is a floating point number having mantissa x and the mantissa of the output word has form A−Bx+Cx2 where A, B and C are predetermined coefficients of the Taylor series.

17. A pipelined circuit as claimed in claim 16, wherein the circuit includes a plurality of ROMs preloaded with values for the coefficients A, B and C.

18. A pipelined circuit as claimed in claim 16 further comprising an error ROM for determining a correction value for the input word.

19. A system for pipelined processing of graphics data, including:
a vertex processor configured to process vertex data to generate processed vertex data;
a rasterizer coupled to receive the processed vertex data and configured to generate pixel-based data in response to the processed vertex data; and
a pixel shader coupled to receive and process the pixel-based data from the rasterizer, wherein at least one of the vertex processor and the pixel shader includes a pipelined circuit for generating an output word in response to an input word indicative of an input value and a control word, where the output word is indicative of a Taylor's series approximation of the reciprocal of the input value and a reciprocal of a square root of the input value based on the control word, said pipelined circuit including:
a first pipeline stage configured to respond to the input word by asserting a first set of values, the values in the first set including a Taylor's series coefficient for each term of a Taylor's series approximation of one of the output word and a mantissa of the output word; and
at least one additional pipeline stage configured to generate the approximation of said one of the output word and the mantissa of the output word by performing at least one of addition, multiplication, and subtraction on a second set of values, wherein the values in the second set include at least one of the values in the first set and at least one intermediate value generated by the at least one additional pipeline stage in response to values including at least one other one of the values in the first set.

20. The system of claim 19, wherein the system is implemented as one of an integrated circuit and a portion of an integrated circuit.

21. The system of claim 19, wherein the input word has a first mantissa and a first exponent, the output word has a second mantissa and a second exponent, the values in the first set include a coefficient value for each term of a Taylor's series approximation of the second mantissa, and the at least one additional pipeline stage is configured to generate said approximation of the second mantissa.

22. The system of claim 21, wherein the pipelined circuit also includes: circuitry coupled and configured to receive the first exponent and to generate the second exponent in response to the first exponent.

23. The system of claim 19, wherein the first mantissa is in one of multiple segments of a range, and the first pipeline stage includes circuitry configured to assert to the at least one additional pipeline stage a coefficient value for each term of the approximation of the second mantissa, wherein the circuitry is configured to generate each said coefficient value in response to data indicating which of the segments includes the first mantissa.

24. The system of claim 19, wherein the first mantissa is in one of multiple segments of a range, the first pipeline stage includes a set of ROMs preloaded with coefficient values for each term of the approximation of the second mantissa, each of the ROMs stores a set of the coefficient values for one said term, and each said set of the coefficient values includes a coefficient value for each of the segments.

25. The system of claim 19, wherein the vertex processor includes a triangle setup module, and the pipelined circuit is an element of the triangle setup module.

26. The system of claim 19, wherein the pipelined circuit is configured to generate the output word in response to the input word and said control word, wherein the output word is indicative of the Taylor's series approximation of the reciprocal of the input value when the control word has a first value, and the output word is indicative of the Taylor's series approximation of the reciprocal of the input value's square root when the control word has a second value.

27. A system as claimed in claim 19, wherein the input word is a floating point number having mantissa x and the mantissa of the output word has form A−Bx+Cx2 where A, B and C are predetermined coefficients of the Taylor series.

28. A method for pipelined processing of graphics data to generate an output word in response to an input word of the data, wherein the input word is indicative of an input value and such that the output word is indicative of a Taylor's series approximation of at least one of a reciprocal of the input value and a reciprocal of the square root of the input value, said method including the steps of:
(a) generating a first set of values in response to the input word during a first interval, the values in the first set including a Taylor's series coefficient for each term of a Taylor's series approximation of one of the output word and a mantissa of the output word;

(b) after step (a), during a subsequent interval, generating the approximation of said one of the output word and the mantissa of the output word by performing at least one of addition, multiplication, and subtraction on a second set of values, wherein the values in the second set include at least one of the values in the first set and at least one intermediate value generated after step (a) in response to values including at least one other one of the values in the first set;

(c) wherein the input word has a first mantissa and a first exponent, the output word has a second mantissa and a second exponent, the values in the first set include a coefficient value for each term of a Taylor's series approximation of the second mantissa, and step (b) includes the step of generating said approximation of the second mantissa; and (d) wherein the first mantissa is in one of multiple segments of a range, and wherein step (a) includes the step of generating the coefficient value for said each term of the approximation of the second mantissa in response to data indicating which of the segments includes the first mantissa.

29. The method of claim 28, also including the step of:

(c) generating the second exponent in response to the first exponent.

30. The method of claim 28, wherein the first mantissa is in one of multiple segments of a range, and wherein step (a) includes the step of reading the coefficient value for said each term of the approximation of the second mantissa from at least one memory in response to data indicating which of the segments includes the first mantissa.

31. The method of claim 30, wherein the first mantissa is in one of N segments of the range, the approximation of the second mantissa has form $A_n - B_n x + C_n x^2$, where "x" is one of the first mantissa and a truncated version of the first mantissa and each of $A_n$, $B_n$, and $C_n$ is one of a set of coefficient values for an "n"th one of the segments.

32. The method of claim 30, wherein the first mantissa is in one of N segments of the range, the approximation of the second mantissa has form $A_n - B_n x + C_n x^2 - E$, where "x" is one of the first mantissa and a truncated version of the first mantissa, each of $A_n$, $B_n$, and $C_n$ is one of a set of coefficient values for an "n"th one of the segments, and E is an error value.

33. The method of claim 28, wherein the approximation of the second mantissa has form $A_n - B_p x + C_q x^2$, where "x" is one of the first mantissa and a truncated version of the first mantissa, $A_n$ is a coefficient of a first coefficient set, $B_p$ is a coefficient of a second coefficient set, and $C_q$ is a coefficient of a third coefficient set, and $1 \leq n \leq N_1$, $1 \leq p \leq N_2$, and $1 \leq q \leq N_3$.

34. The method of claim 28, wherein the output word is generated in response to the input word and said control word, the output word is indicative of the Taylor's series approximation of the reciprocal of the input value when the control word has a first value, and the output word is indicative of the Taylor's series approximation of the reciprocal of the input value's square root when the control word has a second value, and step (a) includes the step of generating the first set of values in response to the input word and the control word.

35. A method as claimed in claim 28, wherein the input word is a floating point number having mantissa x and the mantissa of the output word has form $A - Bx + Cx^2$ where A, B and C are predetermined coefficients of the Taylor series.

* * * * *

UNITED STATES PATENT AND TRADEMARK OFFICE
CERTIFICATE OF CORRECTION

| | |
|---|---|
| PATENT NO. | : 7,117,238 B1 |
| APPLICATION NO. | : 10/247115 |
| DATED | : October 3, 2006 |
| INVENTOR(S) | : Foskett et al. |

Page 1 of 1

It is certified that error appears in the above-identified patent and that said Letters Patent is hereby corrected as shown below:

In column 44, line 43, please replace "$128 \leq N_3 512$", with --$128 \leq N_3 \leq 512$--

Signed and Sealed this

Sixth Day of May, 2008

JON W. DUDAS
*Director of the United States Patent and Trademark Office*